United States Patent
Kumamoto et al.

(10) Patent No.: US 6,970,167 B1
(45) Date of Patent: Nov. 29, 2005

(54) MULTI-LEVEL MANAGEMENT SYSTEM FOR MONITORING COMMUNICATION APPARATUSES

(75) Inventors: Yoshihito Kumamoto, Kawasaki (JP); Takako Nagamine, Kawasaki (JP); Ichiro Ayukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/577,467

(22) Filed: May 24, 2000

(30) Foreign Application Priority Data

Jun. 30, 1999 (JP) ................................. 11-184797

(51) Int. Cl.7 ............................................. G06T 11/20
(52) U.S. Cl. ...................... 345/440; 345/419; 709/200; 709/201; 709/202; 709/203; 709/224; 714/47
(58) Field of Search .......................... 345/740, 1.1, 2.1, 345/736, 419, 440; 709/108, 200, 201, 202, 709/203, 224; 714/47

(56) References Cited

U.S. PATENT DOCUMENTS 5,941,996 A * 8/1999 Smith et al. .................. 714/47

FOREIGN PATENT DOCUMENTS

| JP | 10-333735 | 12/1998 |
| JP | 11-15520  | 1/1999  |

* cited by examiner

Primary Examiner—Kimbinh T. Nguyen
(74) Attorney, Agent, or Firm—Katten Muchin Rosenman LLP

(57) ABSTRACT

A system for monitoring objects based on monitor information indicative of statuses of the objects includes a local monitoring apparatus configured to store therein a first set of the monitor information and a second set of the monitor information, to make the first set of the monitor information reflect an operation performed on the local monitoring apparatus, and to display the first set of the monitor information on the local monitoring apparatus, and a central monitoring apparatus configured to make the second set of the monitor information reflect an operation performed on the central monitoring apparatus through communication with the local monitoring apparatus, and to display the second set of the monitor information on the central monitoring apparatus.

13 Claims, 29 Drawing Sheets

MULTI-LEVEL MANAGEMENT SYSTEM FOR MONITORING COMMUNICATION APPARATUSES

BACKGROUND OF THE INVENTION

1. Field of the Invention

The present invention generally relates to a multi-level management system including a center monitoring apparatus and local monitoring apparatuses which monitor and control monitored apparatuses in a large-scale communication system comprised of a plurality of communication apparatuses.

2. Description of the Related Art

Due to widespread use of standardized SDH (synchronous digital hierarchy) communication networks, network configurations have been rapidly developing in terms of their size and diversity, being connected to various types of communication apparatuses in addition to conventional PDH (plesiochronous digital hierarchy) communication apparatuses.

To keep pace with this development, monitoring apparatuses for administering and controlling communication apparatuses in a system need to be equipped with system functions that make it possible to attend to central control of the large-scale communication system. It is no longer sufficient to be able to monitor and control communication apparatuses only in a confined area.

Also, an effort has been directed to a study on a multi-level management system in consideration of performance limitations of a single control apparatus as well as with an aim of attaining expandability. Here, the multi-level management system includes a central monitoring apparatus for processing summary information and local monitoring apparatuses for controlling communication apparatuses within a given area. In such a multi-level management system, the center monitoring apparatus is expected not only to manage and control summary information but also to manage and control detailed information of each communication apparatuses in each area.

The reason why there is such a demand is that an administrator operating the central monitoring apparatus needs to be promptly and reliably informed of detailed information on current situations of each area if the situations are of an urgent nature. When there is failure that cannot be corrected by a local administer operating on a local monitoring apparatus, or when there is a need for collaborative work between local administrators, the central administrator needs to provide prompt support. The central administrator needs to be prepared and ready to provide support to an area where a failure occurred, and such preparation must be arranged before there is an actual request from a local administrator. To this end, the central monitoring apparatus needs to be able to collect detailed information on status changes of communication apparatuses in much the same manner as the local monitoring apparatus can.

FIG. 29 is an illustrative drawing showing a configuration of a multi-level management system.

Communication apparatuses $3_{11}$ through $3_{nm}$ are installed in various areas over a wide region (such as a nationwide region), and are to be monitored by monitoring apparatuses. The communication apparatuses $3_{11}$ through $3_{nm}$ detect status changes of various monitoring items, and transmit information on the status changes as an event message to local monitoring apparatuses $2_1$ through $2_n$ over a network 5. When receiving instructions from the local monitoring apparatuses $2_1$ through $2_n$, the communication apparatuses $3_{11}$ through $3_{nm}$ attend to various control processing.

The local monitoring apparatuses $2_1$ through $2_n$ monitor the communication apparatuses $3_{11}$ through $3_{nm}$ situated in their respective monitoring areas. The local monitoring apparatuses $2_1$ through $2_n$ display and update respective local monitor screens $21_1$ through $21_n$ that show monitored statuses of the communication apparatuses $3_{11}$ through $3_{nm}$. Further, the local monitoring apparatuses $2_1$ through $2_n$ transmit data of the local monitor screens $21_1$ through $21_n$ to a central monitoring apparatus 1 over a network 4. Further, the local monitoring apparatuses $2_1$ through $2_n$ transmit summary information to the central monitoring apparatus 1 over the network 4 where the summary information is a summary of status changes of the communication apparatuses $3_{11}$ through $3_{nm}$. The central monitoring apparatus 1 attends to central monitoring of all the areas. The central monitoring apparatus 1 displays and updates a central monitor screen 11A that shows monitored statuses of all the area in response to the summary information sent from the local monitoring apparatuses $2_1$ through $2_n$.

Further, the central monitoring apparatus 1 displays local monitor screens $11B_1$ through $11B_n$ which are the same as the local monitor screens $21_1$ through $21_n$ generated by the local monitoring apparatuses $2_1$ through $2_n$. Here, the displaying of the local monitor screens $11B_1$ through $11B_n$ is performed by utilizing a screen display function of the local monitoring apparatuses $2_1$ through $2_n$.

To implement such a multi-level management system as described above, a study has been conducted on use of a browser-based client-sever system. Here, a client is the central monitoring apparatus 1, and servers are the local monitoring apparatuses $2_1$ through $2_n$.

A multi-level management system implemented in such a manner requires monitoring and controlling functions for the communication apparatuses $3_{11}$ through $3_{nm}$ to be provided only in the local monitoring apparatuses $2_1$ through $2_n$ that act as servers, and it is all that is required of the monitoring and controlling functions. Such a configuration means reduced burden on system developments, achieving desirable efficiency.

By the same token, there is a system in which the monitoring and controlling functions for the communication apparatuses $3_{11}$ through $3_{nm}$ are provided only in the local monitoring apparatuses $2_1$ through $2_n$, and display operation functions are provided for each user by use of multi-window display software such as X-windows. In this system, the central monitoring apparatus 1 acting as a user makes a remote access to the local monitoring apparatuses $2_1$ through $2_n$.

When the central monitoring apparatus 1 and the local monitoring apparatuses $2_1$ through $2_n$ attend to monitoring and controlling of the communication apparatuses $3_{11}$ through $3_{nm}$, however, there is a need to insure separate and independent operations between the central monitoring apparatus 1 and the local monitoring apparatuses $2_1$ through $2_n$. Such care must be taken when operations for confirming status changes, operations for displaying operation results, etc., are performed.

When the central monitoring apparatus 1 displays the local monitor screens $11B_1$ through $11B_n$, information shown on the screen is the image information stored in the local monitoring apparatuses $2_1$ through $2_n$. When operations for confirming status changes are made on the local monitor screens $11B_1$ through $11B_n$ of the central monitoring apparatus 1, information about these operations is transmitted to the local monitoring apparatuses $2_1$ through $2_n$ via the network 4, so that the local monitoring apparatuses $2_1$ through $2_n$ update the local monitor screens $21_1$ through $21_n$ accordingly. The local monitoring apparatuses $2_1$ through $2_n$ then send data of the updated local monitor screens $21_1$ through $21_n$ to the central monitoring apparatus 1, allowing the central monitoring apparatus 1 to update the local monitor screens $11B_1$ through $11B_n$.

In this configuration, the local monitor screens $21_1$ through $21_n$ of the local monitoring apparatuses $2_1$ through $2_n$ are updated even through operators of the local monitoring apparatuses $2_1$ through $2_n$ did not confirm the status changes by their confirmation operations.

By the same token, when operators of the local monitoring apparatuses $2_1$ through $2_n$ operate the apparatuses to confirm status changes on the local monitor screens $21_1$ through $21_n$, these confirmation operations end up being reflected by the local monitor screens $11B_1$ through $11B_n$ of the central monitoring apparatus 1. Namely, the display screens of the central monitoring apparatus 1 are affected by operations made not by the operator of the central monitoring apparatus 1, creating inconsistency between operation and display.

Further, the central monitor screen 11A of the central monitoring apparatus 1 does not reflect confirmation operations made at the local monitoring apparatuses $2_1$ through $2_n$. This results in inconsistency between the central monitor screen 11A and the local monitor screens $11B_1$ through $11B_n$.

Accordingly, there is a need for a multi-level management system which allows a monitor screen to reflect an operator operation only if the operation is made at a monitoring apparatus having the very same monitor screen, and keeps consistency of displayed information between the central monitor screen 11A and the local monitor screens $11B_1$ through $11B_n$ of the central monitoring apparatus 1.

Moreover, when an administrator displays a screen-showing various items of status changes, and attends to a confirmation operation, all the items of the displayed status changes are treated as being confirmed. This is the case even when the items are managed by numbers assigned thereto. This presents a problem in that information cannot be confirmed on an item-wise basis. Accordingly, there is a need for a multi-level management system which allows an operator (administrator) to attend to item-wise confirmation.

Further, if the local monitoring apparatuses $2_1$ through $2_n$ try to display all the detailed information that are received from the communication apparatuses $3_{11}$ through $3_{nm}$, the size of the information to be displayed is prohibitively large. To cope with this, display restrictions may be placed on the types of information items, so that only selected items are displayed. In this case, the display restrictions set by the local monitoring apparatuses $2_1$ through $2_n$ affect what is displayed on the local monitor screens $11B_1$ through $11B_n$ of the central monitoring apparatus 1. Namely, information items displayed on the local monitor screens $11B_1$ through $11B_n$ of the central monitoring apparatus 1 is subjected to the same display restriction.

On the other hand, display restrictions set by the central monitoring apparatus 1 do not affect data of the local monitor screens $11B_1$ through $11B_n$ that the local monitoring apparatuses $2_1$ through $2_n$ send to the central monitoring apparatus 1. This results in an inconsistency between the central monitor screen 11A and the local monitor screens $11B_1$ through $11B_n$ of the central monitoring apparatus 1.

Accordingly, there is a need for a multi-level management system which allows a screen of a monitoring apparatus to reflect display restrictions only if the display restrictions are set in this monitoring apparatus, and allows information items selected by an administrator to be displayed while keeping consistency between the central monitor screen 11A and the local monitor screens $11B_1$ through $11B_n$ of the central monitoring apparatus 1.

Further, when an operator of the central monitoring apparatus 1 operates on the local monitor screens $11B_1$ through $11B_n$ to control the local monitoring apparatuses $2_1$ through $2_n$ or the communication apparatuses $3_{11}$ through $3_{nm}$, the central monitoring apparatus 1 will have the local monitoring apparatuses $2_1$ through $2_n$ attend to the requested control processing. In this case, however, history of the operation is recorded in the local monitoring apparatuses $2_1$ through $2_n$, but is not recorded in the central monitoring apparatus 1. This presents a problem that a control operation made at the central monitoring apparatus 1 cannot be later checked.

Accordingly, there is a need for a multi-level management apparatus which allows the central monitoring apparatus 1 to record history of operation even when the operation made at the central monitoring apparatus 1 is directed to control of the local monitoring apparatuses $2_1$ through $2_n$ or the communication apparatuses $3_{11}$ through $3_{nm}$.

SUMMARY OF THE INVENTION

It is a general object of the present invention to provide a system that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a system, a local monitoring apparatus, and a central monitoring apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a system for monitoring objects based on monitor information indicative of statuses of the objects, including a local monitoring apparatus configured to store therein a first set of the monitor information and a second set of the monitor information, to make the first set of the monitor information reflect an operation performed on the local monitoring apparatus, and to display the first set of the monitor information on the local monitoring apparatus, and a central monitoring apparatus configured to make the second set of the monitor information reflect an operation performed on the central monitoring apparatus through communication with the local monitoring apparatus, and to display the second set of the monitor information on the central monitoring apparatus.

According to another aspect of the present invention, a monitoring apparatus for monitoring objects based on monitor information indicative of statuses of the objects includes a memory storage unit which stores therein a first set of the monitor information and a second set of the monitor information, a processing unit which makes the first set of the monitor information reflect an operation performed on the monitoring apparatus, and makes the second set of the monitor information reflect an operation performed on another apparatus connected to the monitoring apparatus via a network, an output unit which locally outputs the first set of the monitor information, and a transmission unit which transmits the second set of the monitor information to the another apparatus via the network.

Further, according to another aspect of the present invention, a monitoring apparatus for monitoring objects based on monitor information indicative of statuses of the objects, connected to a plurality of monitoring apparatuses each monitoring respective groups of the objects, obtaining the monitor information and a summary of the monitor information from each of the monitoring apparatuses, outputting the summary of the monitor information collectively for all the objects, and outputting the monitor information separately for each of the groups of the objects, includes a memory storage unit which stores therein the summary of the monitor information, and a processing unit which makes the summary of the monitor information, stored in the memory storage unit, reflect an operation performed on the monitoring apparatus, and sends a message to the plurality of monitoring apparatuses such that the plurality of monitoring apparatuses make the monitor information, stored in the plurality of monitoring apparatuses, reflect the operation performed on the monitoring apparatus.

DESCRIPTION OF THE PREFERRED EMBODIMENTS

In the following, embodiments of the present invention will be described with reference to the accompanying drawings.

Figure 1:
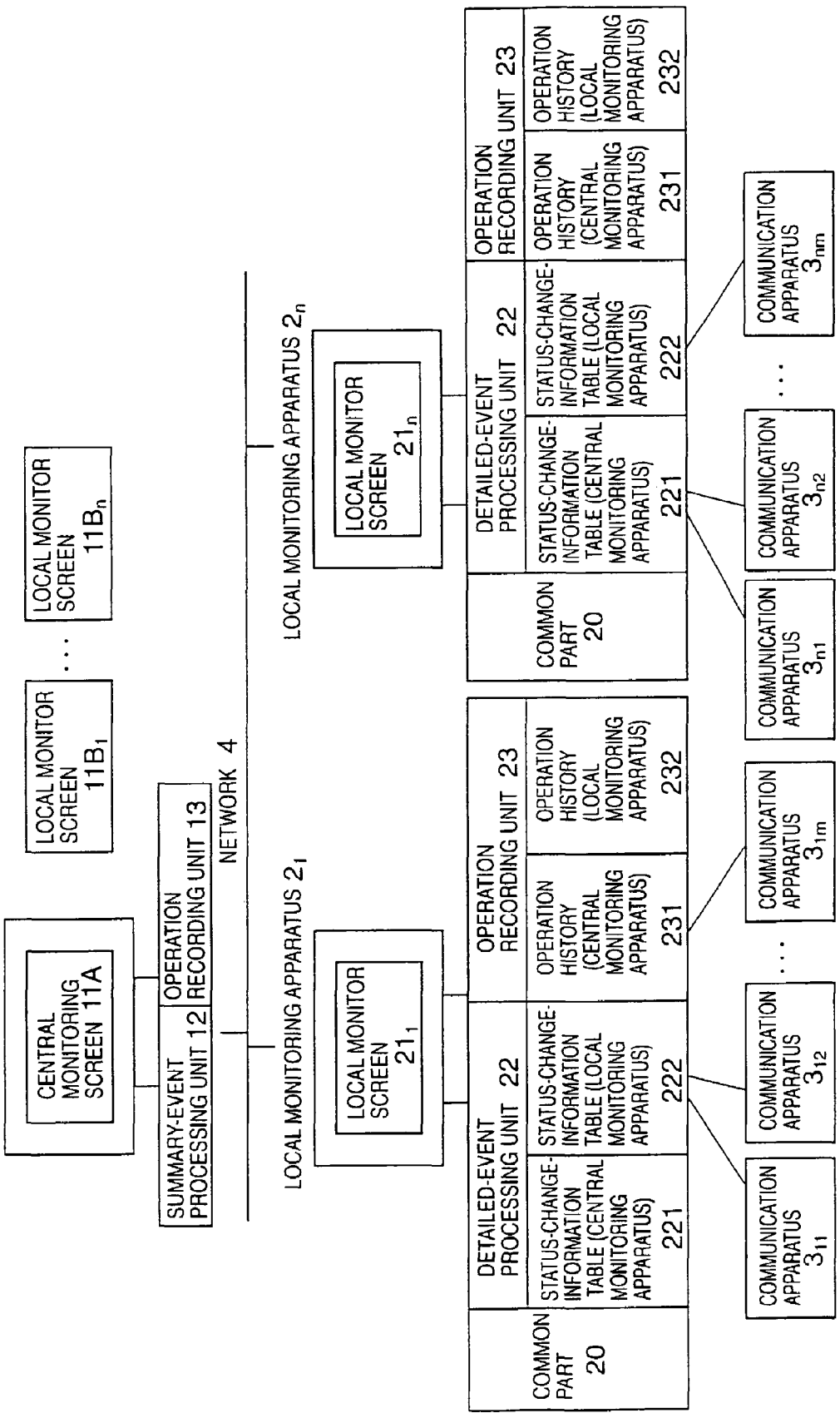
FIG. 1 is an illustrative drawing showing a basic configuration of a multi-level management system according to the present invention.

FIG. 1 is an illustrative drawing showing a basic configuration of a multi-level management system according to the present invention. FIG. 1 shows main functions provided in the system. The central monitoring apparatus 1 displays the central monitor screen 11A for showing monitored statuses of all local areas and the local monitor screens $11B_1$ through $11B_n$ for showing monitored statuses on an area-wise basis.

The central monitoring apparatus 1 includes a summary-event processing unit 12 and an operation recording unit 13. The summary-event processing unit 12 manages and controls monitored statuses and status changes with respect to each local area. The summary-event processing unit 12 receives a summary status-change message from each of the local monitoring apparatuses $2_1$ through $2_n$, and detects a status change of a monitored status with respect to each local area. In order to have the central monitor screen 11A reflect the change, the central monitoring apparatus 1 informs a central-monitor-screen-display applet of this status change. The operation recording unit 13 records operation history with regard to control operations, option setting operations, etc., when an administrator operating the central monitoring apparatus 1 attends to these operations.

The local monitoring apparatuses $2_1$ through $2_n$ monitor statuses of the communication apparatuses $3_{11}$ through $3_{nm}$ within their respective monitoring areas, and display the local monitor screens $21_1$ through $21_n$ that show monitored statuses.

Each of the local monitoring apparatuses $2_1$ through $2_n$ includes a common part 20, a detailed-event processing unit 22, and an operation recording unit 23. The detailed-event processing unit 22 controls status-change-information tables for monitoring status changes of the communication apparatuses $3_{11}$ through $3_{nm}$ separately for a local monitoring apparatus and for a central monitoring apparatus.

A status-change-information table 221 for a central monitoring apparatus is used for the local monitor screens of the central monitoring apparatus 1, and a status-change-information table 222 for a local monitoring apparatus is used for the local monitor screens of the local monitoring apparatuses $2_1$ through $2_n$.

The operation recording unit 23 records operation history with regard to control operations, option setting operations, etc., performed at the local monitoring apparatuses $2_1$ through $2_n$. The operation history is recorded separately as an operation history 231 for the central monitoring apparatus and an operation history 232 for the local monitoring apparatus.

The status-change-information table 221 for a central monitoring apparatus and the status-change-information table 222 for a local monitoring apparatus may be provided as separate physical memory units, or may be provided as separate logical units. By the same token, the operation history 231 for a central monitoring apparatus and the operation history 232 for a local monitoring apparatus may be provided as separate physical memory units, or may be provided as separate logical units.

Figure 2:
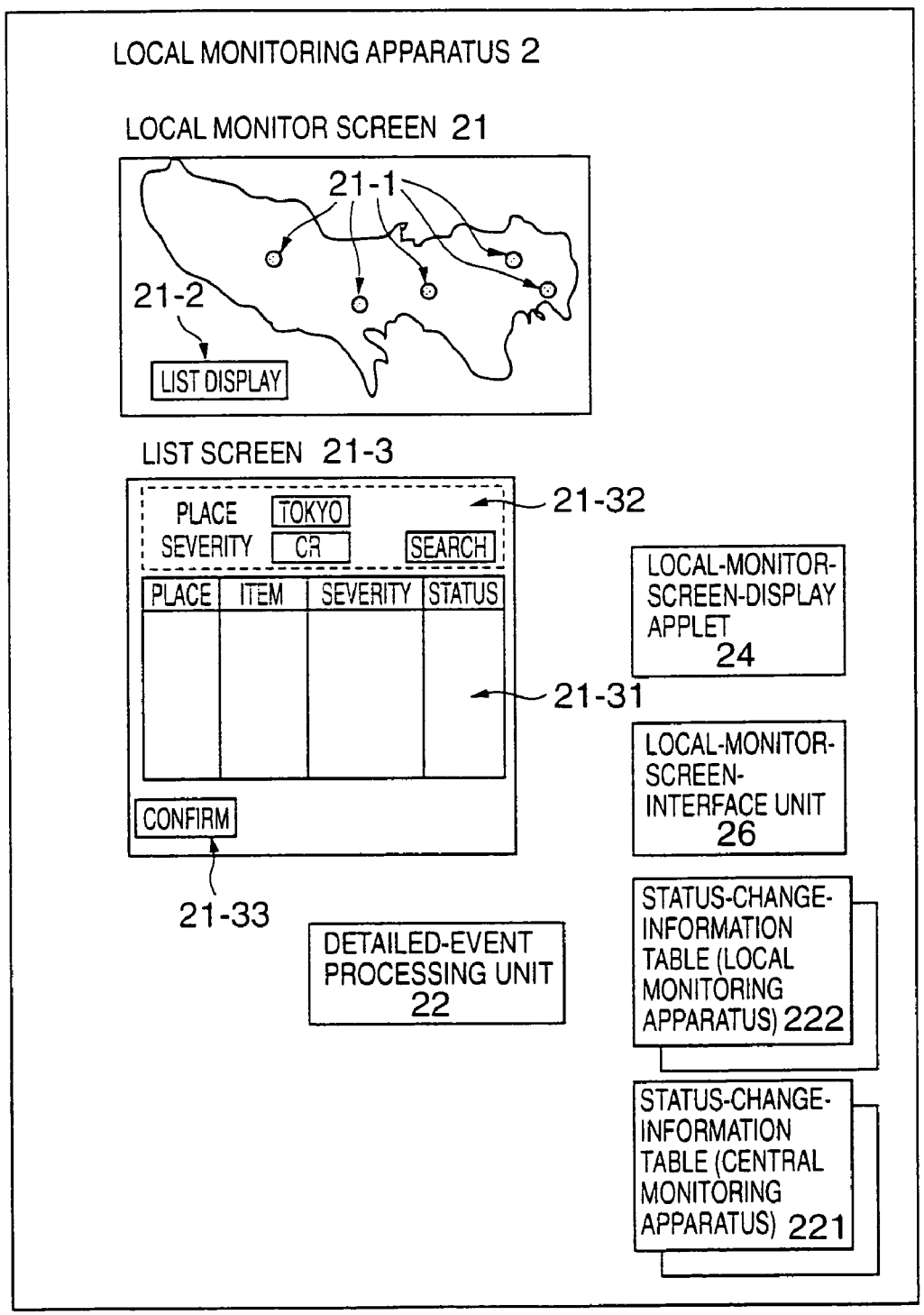
FIG. 2 is an illustrative drawing showing a monitor screen and main function blocks of a local monitoring apparatus according to the present invention.
Figure 3:
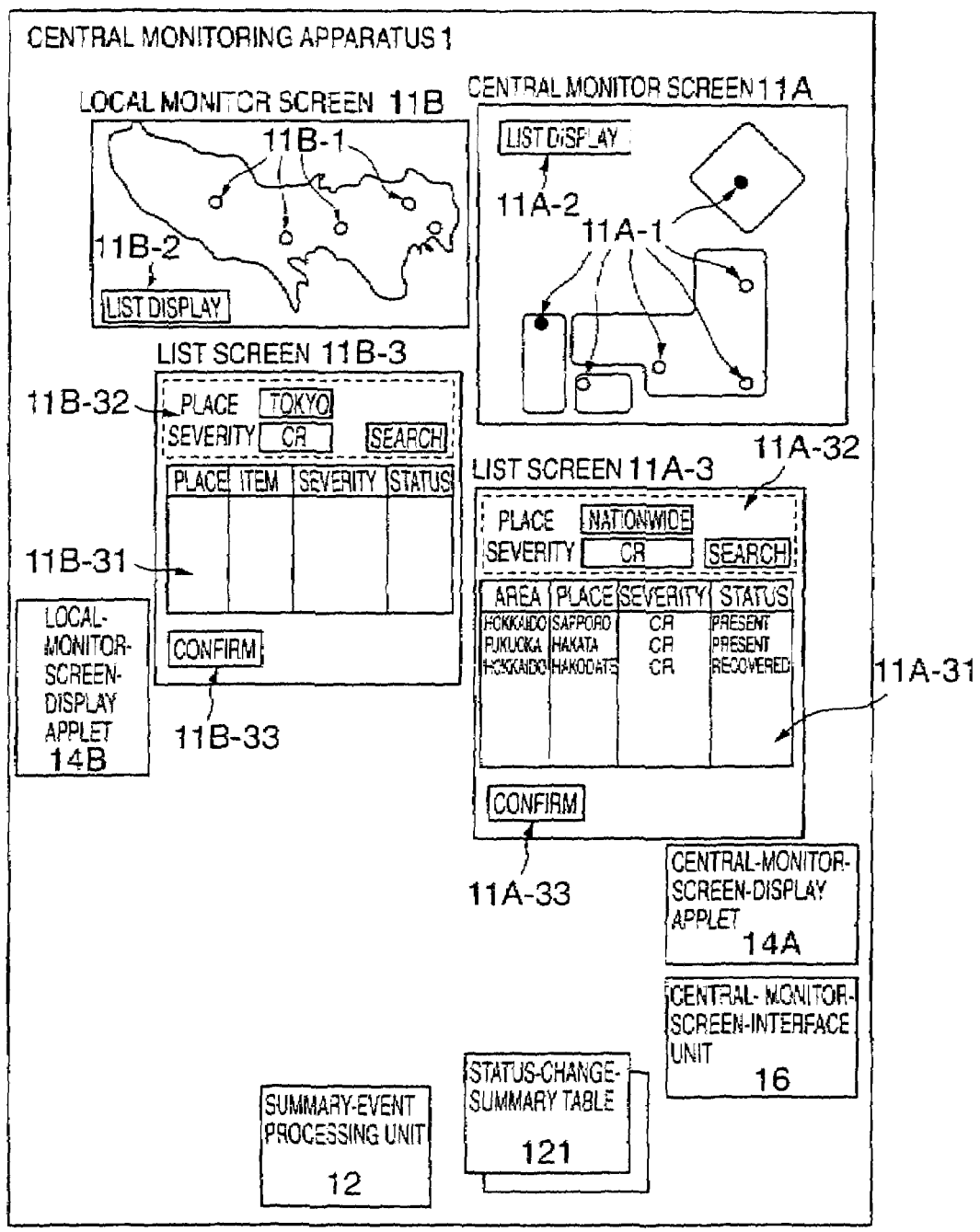
FIG. 3 is an illustrative drawing showing monitor screens and main function blocks of a central monitoring apparatus according to the present invention.

FIG. 2 is an illustrative drawing showing a monitor screen and main function blocks of a local monitoring apparatus according to the present invention. FIG. 3 is an illustrative drawing showing monitor screens and main function blocks of the central monitoring apparatus according to the present invention. Since all the local monitoring apparatuses $2_1$ through $2_n$ have the same configuration, a local monitoring apparatus will be described in the following with no suffix attached to a reference number.

As shown in FIG. 2, local monitoring apparatus 2 displays a local monitor screen 21 and a list screen 21-3. As shown in FIG. 3, the central monitoring apparatus 1 displays the central monitor screen 11A and a local monitor screen 11B as well as respective list screens 11A-3 and 11B-3.

The local monitor screen 21 of the local monitoring apparatus 2 and the local monitor screen 11B of the central monitoring apparatus 1 display monitored statuses of communication apparatuses installed at various locations within a given area. These screens are displayed on the local monitoring apparatus 2 and the central monitoring apparatus 1 by using a screen display function of the local monitoring apparatus 2.

The local monitor screen 21 and the local monitor screen 11B show communication-apparatus icons 21-1 and 11B-1, respectively, representing the communication apparatuses. The communication-apparatus icons 21-1 and 11B-1 indicate severity of status changes of monitored items by use of a corresponding display color. Here, the indicated severity is the most significant severity among a plurality of severities of respective monitored items.

Severity is a rank pre-assigned to a status change according to an urgency of a corrective action required to cure a situation when the status change occurs in the communication apparatuses $3_{11}$ through $3_{nm}$. Severity is given to each monitored item. An example of ranks of severity is shown in Table 1 in the following.

TABLE 1

| SEVERITY | URGENCY |
|---|---|
| CR (critical) | most urgent |
| MJ (major) | more urgent |
| MN (minor) | urgent |
| WR (warning) | less urgent |
| NA (not alarm) | least urgent |

When a communication apparatus has a monitored item A having a status change of a severity level MJ (major) and a monitored item B having a status change of a severity level WR (warning), the communication-apparatus icons 21-1 and 11B-1 of this apparatus is displayed in a color corresponding to the severity MJ (e.g., orange).

Further, the communication-apparatus icons 21-1 and 11B-1 are flickered in order to call an administrator's attention to a status change when the status change occurs in a corresponding communication apparatus. When an administrator checks the status change and confirms the situation by a confirmation operation, the flickering will stop.

The local monitor screen 21 and the local monitor screen 11B include respective list-display buttons 21-2 and 11B-2 for displaying a list of status-change information for the purpose of local monitoring. When the button is clicked, the list screen 21-3 or the list screen 11B-3 will be displayed.

The list screens 21-3 and 11B-3 of status-change information for local monitoring purposes include list fields 21-31 and 11B-31, which show status changes that occurred in the communication apparatuses in a chronological order. The list screens 21-3 and 11B-3 further include condition setting fields 21-32 and 11B-32, respectively, to make settings to conditions that are used to select information items displayed in the list screens.

Information items to be listed in the list screens 21-3 and 11B-3 can be selected by using locations of the communication apparatuses, severity, etc., as search keys. The condition setting fields 21-32 and 11B-32 include boxes corresponding to the search keys, and further includes a search start button.

Further, the list screens 21-3 and 11B-3 include confirmation buttons 21-33 and 11B-33, respectively. When an administrator clicks the confirmation button 21-33 or 11B-33 after confirming status changes listed in the list, the status changes are removed from the list as items being confirmed. If all the status changes are confirmed and erased for a given communication apparatus, a corresponding communication-apparatus icon 21-1 or 11B-1 stops flickering.

In FIG. 3, the central monitor screen 11A of the central monitoring apparatus 1 displays a status of each local area that is monitored by a corresponding local monitoring apparatus 2. The central monitor screen 11A shows area icons 11A-1 each representing a status of a corresponding local area. An area icon 11A-1 of a given local area is displayed in a color that corresponds to the highest severity level among various severity levels of status changes occurring in this local area.

For example, when there is a monitored item A having a status change of severity MJ in a given local area, and there is a monitored item B having a severity WR in the same local area, the area icon 11A-1 of this local area is shown in a color corresponding to the severity MJ that is the highest of the two.

The area icons 11A-1 flicker in order to call an administrator's attention to status changes when the status changes occur in the corresponding local areas. The flickering of an area icon 11A-1 stops when the administrator checks all the status changes occurring in a corresponding local area and confirms the situation by a confirmation operation.

The central monitor screen 11A includes a list-display button 11A-2 for displaying a list of status-change information for the purpose of central monitoring. When the button is clicked, a list screen 11A-3 is displayed to show a list of status-change information.

The list screen 11A-3 of status-change information for central monitoring purposes includes a list field 11A-31, which shows status changes that occurred in the communication apparatuses in a chronological order. The list screen 11A-3 further includes a condition setting field 11A-32 for the purpose of making settings to conditions that are used to select information items displayed in the list screens.

Information items to be listed in the list screen 11A-3 can be selected by using locations of +the communication apparatuses, severity, etc., as search keys. The condition setting field 11A-32 includes boxes corresponding to the search keys, and further includes a search start button.

Further, the list screen 11A-3 includes a confirmation button 11A-33. When an administrator clicks the confirmation button 11A-33 after confirming status changes listed in the list, the status changes are removed from the list as items being confirmed. If all the status changes are confirmed and erased for a given local area, a corresponding area icon 11A-1 stops flickering.

A local-monitor-screen-display applet 24 provided in the local monitoring apparatus 2 controls displaying of the local monitor screen 21, and controls interfacing with operator operations made to the local monitor screen 21. A local-monitor-screen-display applet 14B of the central monitoring apparatus 1 controls displaying of the local monitor screen 11B, and controls interfacing with operator operations made to the local monitor screen 11B. A central-monitor-screen-display applet 14A of the central monitoring apparatus 1 controls displaying of the central monitor screen 11A, and controls interfacing with operator operations made to the central monitor screen 11A.

A local-monitor-screen-interface unit 26 of the local monitoring apparatus 2 provides functions of exchanging messages and responses so as to support interface between the local-monitor-screen-display applet 24, the local-monitor-screen-display applet 14B, and various processing units of the local monitoring apparatus 2.

A central-monitor-screen-interface unit 16 of the central monitoring apparatus 1 provides functions of exchanging messages and responses so as to support interface between the central-monitor-screen-display applet 14A and various processing units of the central monitoring apparatus 1.

The detailed-event processing unit 22 of the local monitoring apparatus 2 has functions to manage and control current situations and status changes with respect to each monitored items of each communication apparatus. Further, the detailed-event processing unit 22 manages and controls status changes reported in summary information when the summary information is obtained for a local area that is monitored by the local monitoring apparatus 2.

The detailed-event processing unit 22 detects a status change of a monitored item in a communication apparatus upon receiving an event message from the communication apparatus. When this happens, the detailed-event processing unit 22 sends an even message indicative of the status change to the local-monitor-screen-display applet 24 via the local-monitor-screen-interface unit 26, and, also, sends an event message indicative of the status change to the local-monitor-screen-display applet 14B of the central monitoring apparatus 1 via the network. Further, when detecting a status change in the summary information of the local area that is monitored by the local monitoring apparatus 2, the detailed-event processing unit 22 transmits an event message indicative of the status change to the summary-event processing unit 12 of the central monitoring apparatus 1 via the network.

Moreover, the detailed-event processing unit 22 receives a request for displaying current situations and status changes when the request is sent from the local-monitor-screen-display applet 24 or 14B. Upon receipt of the request, the detailed-event processing unit 22 sends requested information to the local-monitor-screen-display applet 24 or 14B, which displays in turn the contents of the status-change-information table on the display screen of the monitoring apparatus that issued the request.

The status-change-information tables 221 and 222 are respectively provided for the central monitoring apparatus 1 and the local monitoring apparatus 2, and are used to monitor and control a time of occurrence of a status change, a nature of a status change, etc., with respect to each monitored item that experienced a status change.

Generation and updating of the status-change-information tables 221 and 222 are attended to by the detailed-event processing unit 22. The detailed-event processing unit 22 generates a table for a monitoring apparatus when an administrator starts up this monitoring apparatus.

Namely, when an administrator of the local monitoring apparatus 2 starts up the apparatus, the status-change-information table 222 for the local monitoring apparatus is generated. When an administrator of the central monitoring apparatus 1 starts up the apparatus, the status-change-information table 221 for the central monitoring apparatus is generated. Thereafter, each time a communication apparatus sends an event message, the detailed-event processing unit 22 updates the status-change-information tables 221 and 222 accordingly.

When an administrator performs a confirmation operation, the status changes that are confirmed are removed from a corresponding one of the status-change-information tables 221 and 222. Namely, when an operator of the local monitoring apparatus 2 confirms status changes, the status changes are removed from the status-change-information table 222 for the local monitoring au apparatus. On the other hand, when an operator of the central monitoring apparatus 1 attends to confirmation operation, confirmed status changes are removed from the status-change-information table 221 for the central monitoring apparatus.

The summary-event processing unit 12 of the central monitoring apparatus 1 detects a status change of a local area when receiving a status change message in summary information that is sent from the local monitoring apparatus 2 via the network. Upon detection of the status change, the summary-event processing unit 12 sends an even message indicative of the status change to the central-monitor-screendisplay applet 14A. Further, when receiving a request from the central-monitor-screen-display applet 14A requesting to display current situations and status changes, the summary-event processing unit 12 extracts requested information from a status-change-summary table 121, and sends it to the central-monitor-screen-display applet 14A.

The status-change-summary table 121 is used to monitor and control a time of occurrence of a status change, a nature of a status change, etc., with respect to each local area. Generation of the status-change-summary table 121 is attended to by the summary-event processing unit 12 at the time of start up of the central monitoring apparatus 1. Thereafter, whenever a message of status change of summary information is received from the local monitoring apparatus 2, the summary-event processing unit 12 updates the status-change-summary table 121. When the administrator of the central monitoring apparatus 1 confirms a status change on the central monitor screen 11A, the confirmed status change is removed from the status-change-summary table 121.

The status-change-information tables 221 and 222 store therein detailed information on each monitored item with respect to each communication apparatus provided within a given local area in order to provide status-change information for the local monitor screen 11B of the central monitoring apparatus 1 and the local monitor screen 21 of the local monitoring apparatus 2, respectively. On the other hand, the status-change-summary table 121 stores therein macro information on each area with respect to each severity level in order to provide status-change information for the central monitor screen 11A.

When status changes take place as shown in Table 2 as follows, information shown in Table 3 will be displayed on the local monitor screens, and information shown in Table 4 will be displayed on the central monitor screen. (Please note that Tachikawa cited in the tables is a name of a city in Tokyo.)

TABLE 2

| 1 | Tachikawa | Failure of Equipment A | CR | present |
| 2 | Tachikawa | Hitch of Equipment B | CR | present |
| 3 | Tachikawa | Hitch of Equipment C | MN | present |
| 4 | Tachikawa | Failure of Equipment A | CR | recovered |
| 5 | Tachikawa | Hitch of Equipment B | CR | recovered |

TABLE 3

| 1 | Tachikawa | Failure of Equipment A | CR | present |
| 2 | Tachikawa | Hitch of Equipment B | CR | present |
| 3 | Tachikawa | Hitch of Equipment C | MN | present |
| 4 | Tachikawa | Failure of Equipment A | CR | recovered |
| 5 | Tachikawa | Hitch of Equipment B | CR | recovered |

TABLE 4

| 1 | Tokyo | Tachikawa | CR | present |
| 2 | Tokyo | Tachikawa | CR | additional |
| 3 | Tokyo | Tachikawa | MN | present |
| 4 | Tokyo | Tachikawa | CR | partly recovered |
| 5 | Tokyo | Tachikawa | CR | recovered |

When the central monitoring apparatus 1 manages and controls status changes only with respect to occurrence and recovery thereof by using severity-based macro information, information shown on the central monitor screen in response to the status changes of Table 2 will be as follows.

TABLE 5

| 1 | Tokyo | Tachikawa | CR | present |
| 3 | Tokyo | Tachikawa | MN | present |
| 5 | Tokyo | Tachikawa | CR | recovered |

Figure 4:
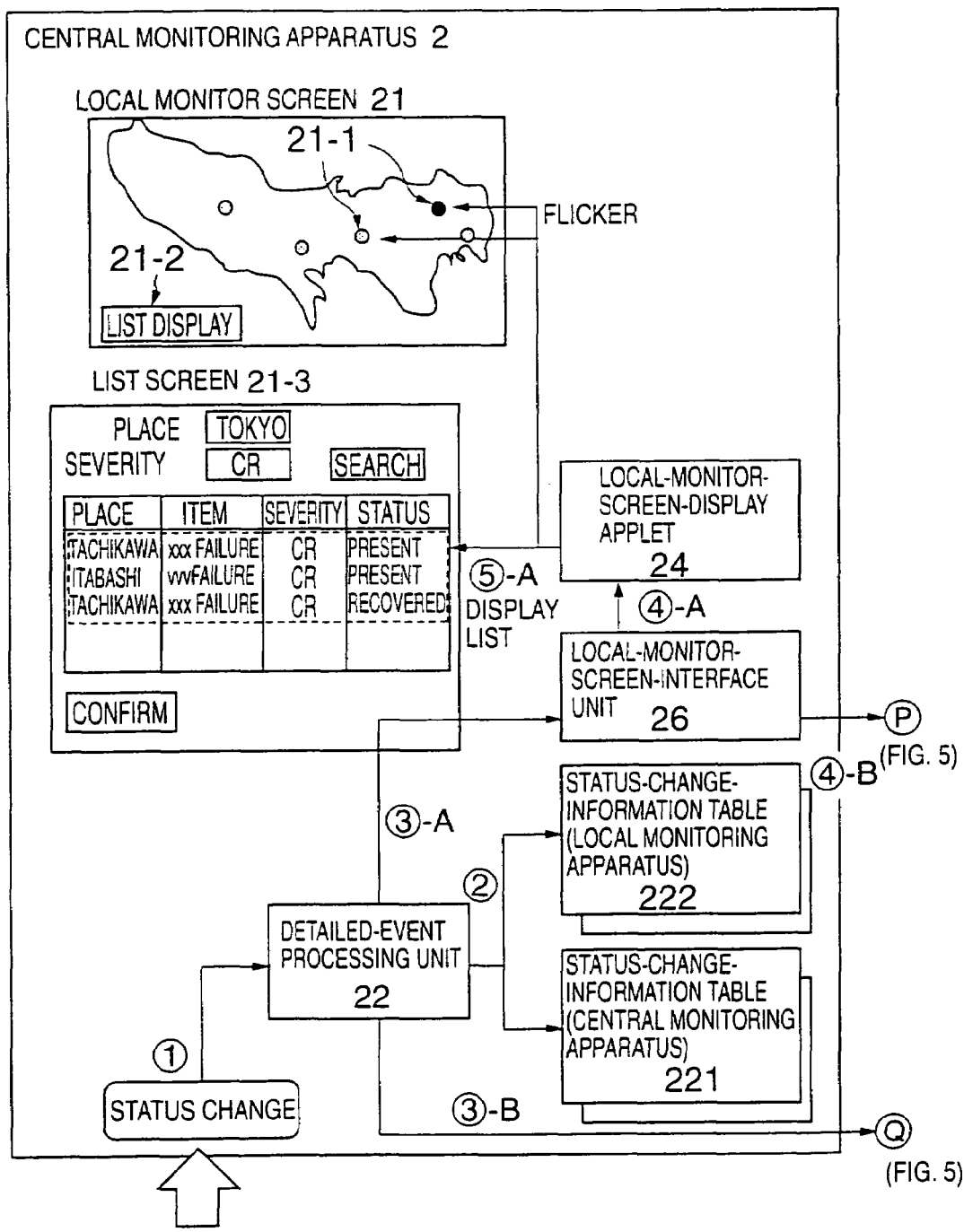
FIG. 4 is a process flow of a process performed by the local monitoring apparatus when a status change occurs.
Figure 5:
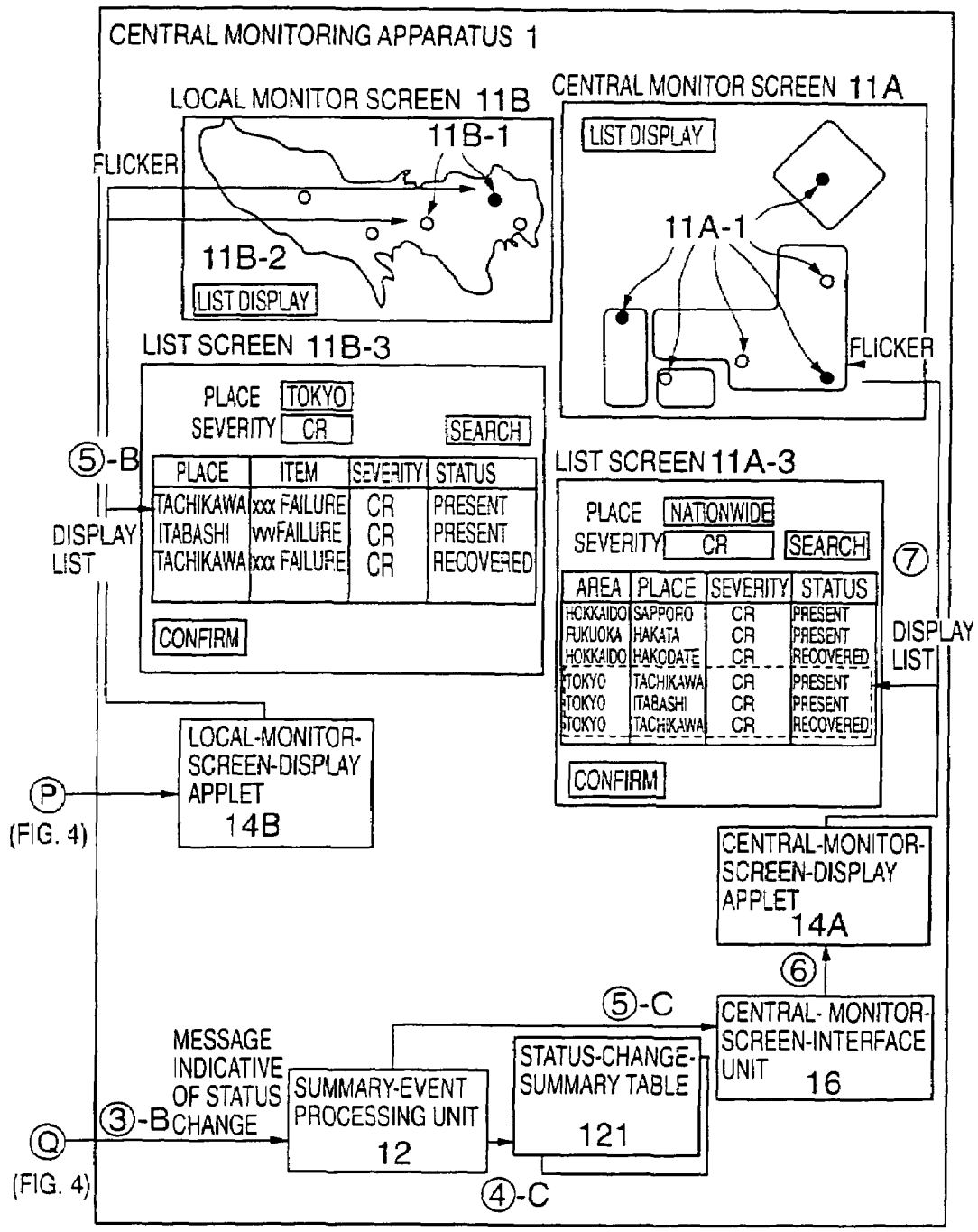
FIG. 5 is a process flow of a process performed by the central monitoring apparatus when a status change occurs.

FIG. 4 is a process flow of a process performed by the local monitoring apparatus when a status change occurs. FIG. 5 is a process flow of a process performed by the central monitoring apparatus when a status change occurs.

Upon detecting a status change of a monitored item, a communication apparatus sends an event message indicative of the status change to the detailed-event processing unit 22 of the local monitoring apparatus 2 (step ST1).

Having received the event message, the detailed-event processing unit 22 checks whether there is a status change. If there is status change in a monitored item, the detailed-event processing unit 22 updates the status-change-information table 221 for the central monitoring apparatus and the status-change-information table 222 for the local monitoring apparatus (step ST2).

Further, the detailed-event processing unit 22 notifies the local-monitor-screen-interface Z=unit 26 of the status change (step ST3-A). In response, the local-monitor-screen-interface unit 26 informs the local-monitor-screen-display applet 24 of the status change (step ST4-A), and, also, reports the status change to the local-monitor-screen-display applet 14B of the central monitoring apparatus 1 via the network (step ST4-B).

Further, the detailed-event processing unit 22 sends an event message to the summary-event processing unit 12 of the central monitoring apparatus 1 via the network (step ST3-B) if there is a change in summary information about a local area that is monitored by the local monitoring apparatus 2.

Upon receiving the message of status change from the local-monitor-screen-interface unit 26, the local-monitor-screen-display applet 24 changes a display color of the communication-apparatus icon 21-1 of the communication apparatus that is experiencing the status change. This change of color is made based on the received status-change information. Further, the local-monitor-screen-display applet 24 updates the local monitor screen 21 so as to make the icon flicker, and displays a list of status-change information on the list screen 21-3 in response to click on the list-display button (step ST5-A).

In the central monitoring apparatus 1, the local-monitor-screen-display applet 14B, which has received the message of status change, changes a display color of the communication-apparatus icon 11B-1 of the communication apparatus that is experiencing the status change. This change of color is made based on the received status-change information. Further, the local-monitor-screen-display applet 14B updates the local monitor screen 11B so as to make the icon flicker, and displays a list of status-change information on the list screen 11B-3 in response to click on the list-display button (step ST5-B).

Having received the event message indicative of status change in the summary information, the summary-event processing unit 12 updates the status-change-summary table 121 (step ST4-C), and sends an event message indicative of the status change to the central-monitor-screen-display applet 14A via the central-monitor-screen-interface unit 16 (steps ST5-C and ST6).

In response to the event message, the central-monitor-screen-display applet 14A changes a display color of the area icon 11A-1 of the area that is experiencing the status change. This change of color is made based on the received status-change information. Further, the central-monitor-screen-display applet 14A updates the central monitor screen 11A so as to make the icon flicker, and displays a list of status-change information on the list screen 11A-3 in response to click on the list-display button (step ST7).

A process concerning the displaying of the list will be described below in detail. When the list-display button 21-2 is clicked on the local monitor screen 21 of the local monitoring apparatus 2, the local-monitor-screen-display applet 24 sends a request for transfer of status-change information to the detailed-event processing unit 22 via the local-monitor-screen-interface unit 26.

In response to the request for transfer of status-change information, the detailed-event processing unit 22 reads status-change information from the status-change-information table 222 for the local monitoring apparatus, and sends the status-change information to the local-monitor-screen-Ad display applet 24 via the local-monitor-screen-interface unit 26. The local-monitor-screen-display applet 24 has the list screen 21-3 reflect the contents of the status-change information.

When a list-display operation is performed on the local monitor screen 11B of the central monitoring apparatus 1, the local-monitor-screen-display applet 14B of the central monitoring apparatus 1 detects a click on the list-display button 11B-2. Then, the local-monitor-screen-display applet 14B sends a request for transfer of status-change information to the detailed-event processing unit 22 of the local monitoring apparatus 2 via the network and the local-monitor-screen-interface unit 26 of the local monitoring apparatus 2.

In response to the request for transfer of status-change information sent from the central monitoring apparatus 1, the detailed-event processing unit 22 reads status-change information from the status-change-information table 221 for the central monitoring apparatus, and sends the status-change information to the local-monitor-screen-display applet 14B of the central monitoring apparatus 1 via the local-monitor-screen-interface unit 26 and the network. The local-monitor-screen-display applet 14B has the list screen 11B-3 reflect the contents of the status-change information.

When a list-display operation is performed on the central monitor screen 11A of the central monitoring apparatus 1, the central-monitor-screen-display applet 14A of the central monitoring apparatus 1 detects a click on the list-display button. Then, the central-monitor-screen-display applet 14A sends a request for transfer of status-change information to the summary-event processing unit 12 via the central-monitor-screen-interface unit 16.

In response to the request for transfer of status-change information, the summary-event processing unit 12 reads status-change information from the status-change-summary table 121, and sends the status-change information to the central-monitor-screen-display applet 14A via the central-monitor-screen-interface unit 16. The central-monitor-screen-display applet 14A has the list screen 11A-3 reflect the contents of the status-change information.

Figure 6:
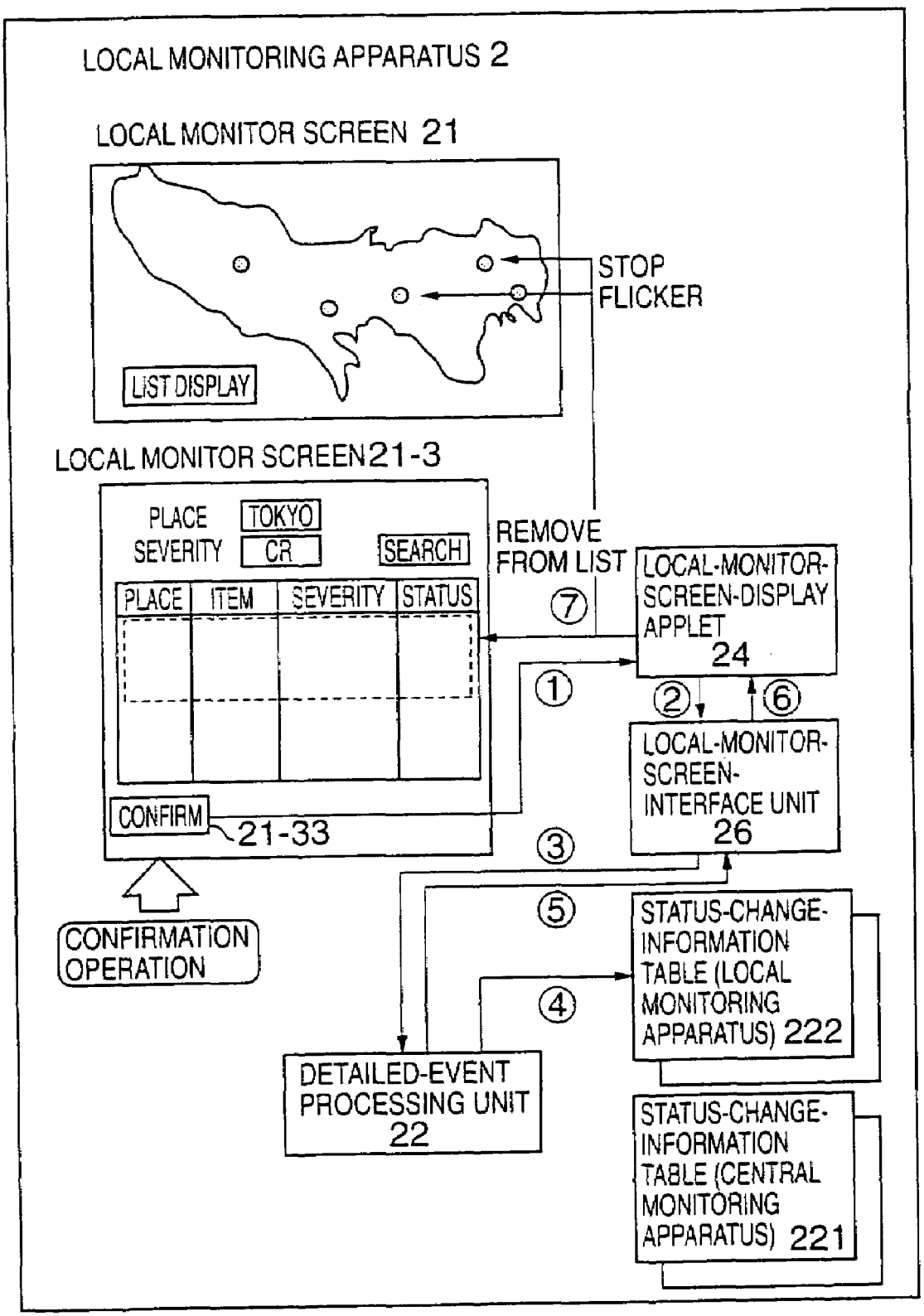
FIG. 6 is a process flow of a process performed by the local monitoring apparatus when a confirmation operation is carried out.

FIG. 6 is a process flow of a process performed by the local monitoring apparatus when a confirmation operation is carried out.

When the confirmation button 21-33 is clicked on the list screen 21-3 of the local monitoring apparatus 2, the local-monitor-screen-display applet 24 detects the click (step ST1). The local-monitor-screen-display applet 24 sends a request to the detailed-event processing unit 22 via the local-monitor-screen-interface unit 26 so as to request a confirmation process to be performed (steps ST2 and ST3).

Upon receiving the request for a confirmation process, the detailed-event processing unit 22 erases status-change information from the status-change-information table 222 for the local monitoring apparatus in accordance with the contents of the request (step ST4). Further, the detailed-event processing unit 22 sends a response acknowledging the status-change confirmation to the local-monitor-screen-display applet 24 via the local-monitor-screen-interface unit 26 (steps ST5 and ST6).

Having received the response, the local-monitor-screen-display applet 24 erases the confirmed information from the list screen 21-3 showing status-change information, and stops flickering of the communication-apparatus icon that represents the communication apparatus for which the status-change information was already confirmed (step ST7).

Figure 7:
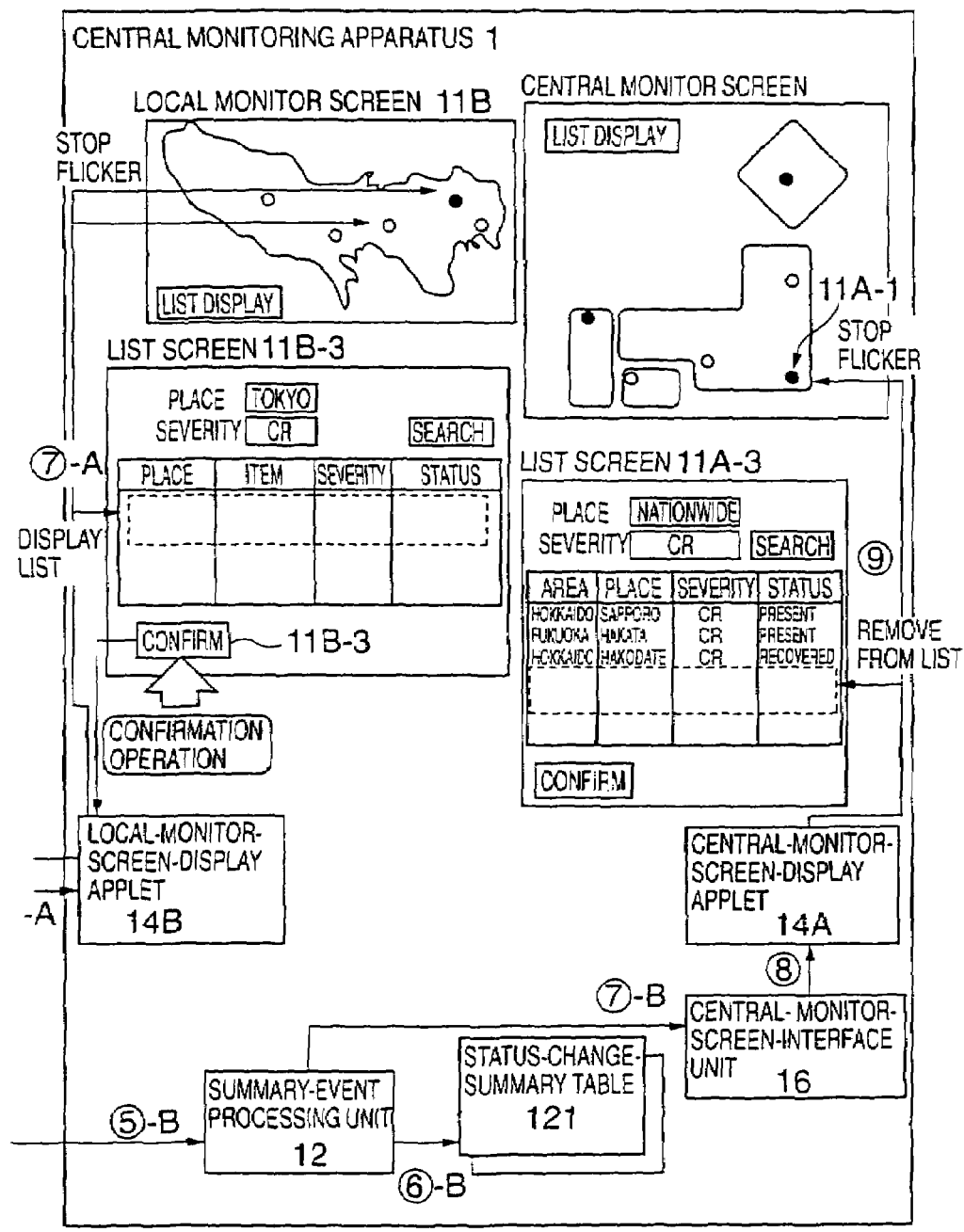
FIG. 7 is a process flow of a process performed by the central monitoring apparatus when a confirmation operation is carried out on a local monitor screen of the central monitoring apparatus.
Figure 8:
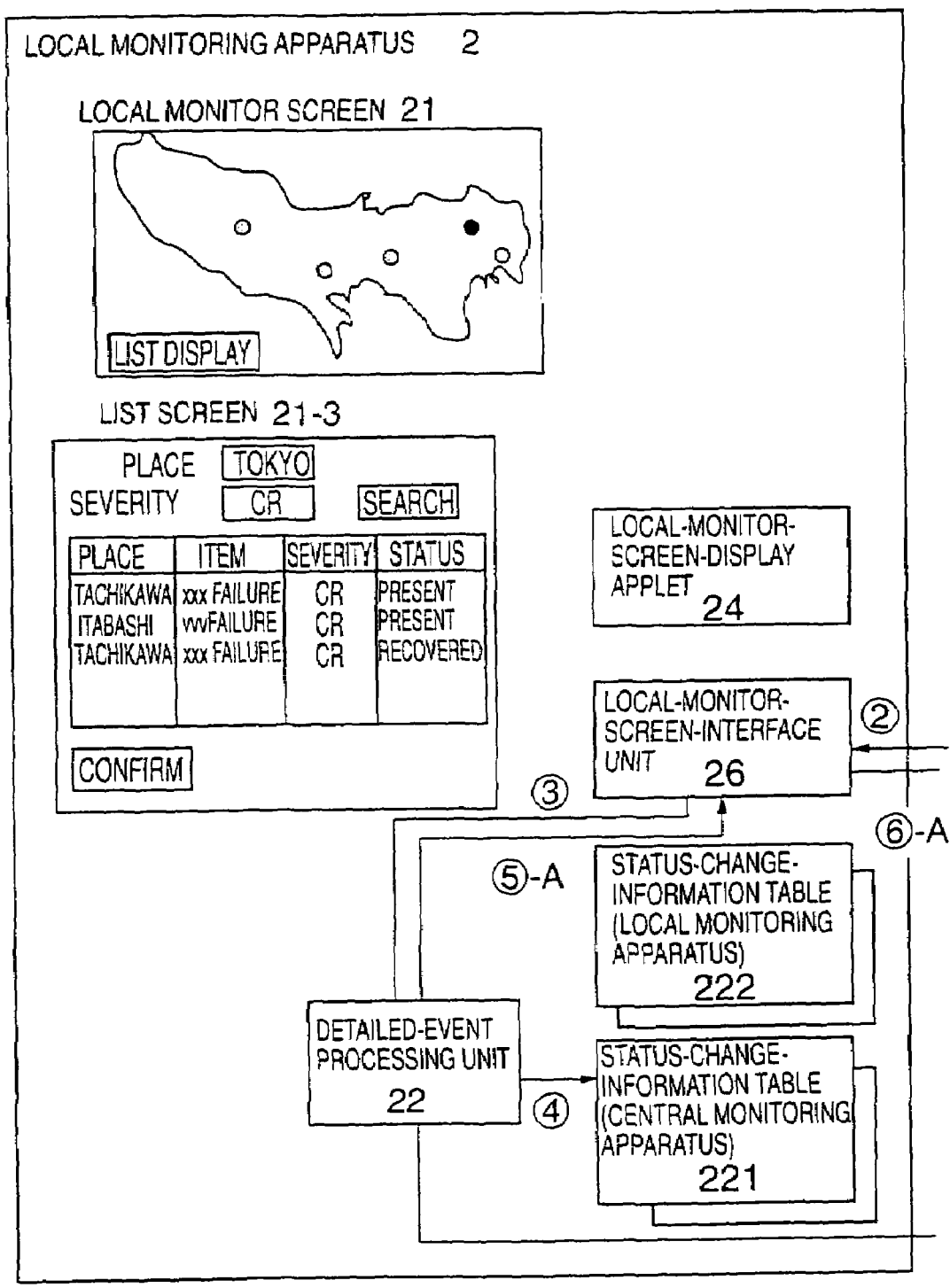
FIG. 8 is a process flow of a process performed by the local monitoring apparatus when a confirmation operation is carried out on the local monitor screen of the central monitoring apparatus.

FIG. 7 is a process flow of a process performed by the central monitoring apparatus 1 when a confirmation operation is carried out on the local monitor screen of the central monitoring apparatus. FIG. 8 is a process flow of a process performed by the local monitoring apparatus 2 when a confirmation operation is carried out on the local monitor screen of the central monitoring apparatus.

When the confirmation button 11B-33 is clicked on the list screen 11B-3 associated with the local monitor screen 11B of the central monitoring apparatus 1, the local-monitor-screen-display applet 14B detects the click (step ST1). The local-monitor-screen-display applet 14B sends a request to the detailed-event processing unit 22 via the network and the local-monitor-screen-interface unit 26 of the local monitoring apparatus 2 so as to request a confirmation process to be performed (steps ST2 and ST3).

Upon receiving the request for a confirmation process, the detailed-event processing unit 22 erases status-change information from the status-change-information table 221 for the central monitoring apparatus in accordance with the contents of the request (step ST4). Further, the detailed-event processing unit 22 sends a response acknowledging the status-change confirmation to the local-monitor-screen-display applet 14B of the central monitoring apparatus 1 via the local-monitor-screen-interface unit 26 (steps ST5-A and ST6-A), and sends a message indicative of status-change confirmation to the summary-event processing unit 12 of the central monitoring apparatus 1 (step ST5-B).

Having received the response acknowledging the status-change confirmation, the local-monitor-screen-display applet 14B erases the confirmed information from the list screen 11B-3 showing status-change information, and stops flickering of the communication-apparatus icon that represents the communication apparatus for which the status-change information was already confirmed (step ST7-A).

Having received the message indicative of status-change confirmation, the summary-event processing unit 12 erases the confirmed status-change information from the status-change-summary table 121 in accordance with the contents of the message, and sends a message indicative of status-change confirmation to the central-monitor-screen-display applet 14A via the central-monitor-screen-interface unit 16 (steps ST7-B and ST8).

In response to the message indicative of status-change confirmation, the central-monitor-screen-display applet 14A erases the confirmed status-change information from the list screen 11A-3 showing status-change information, and stops flickering of the area icon 11A-1 that corresponds to the confirmed status-change information (step ST9).

Figure 9:
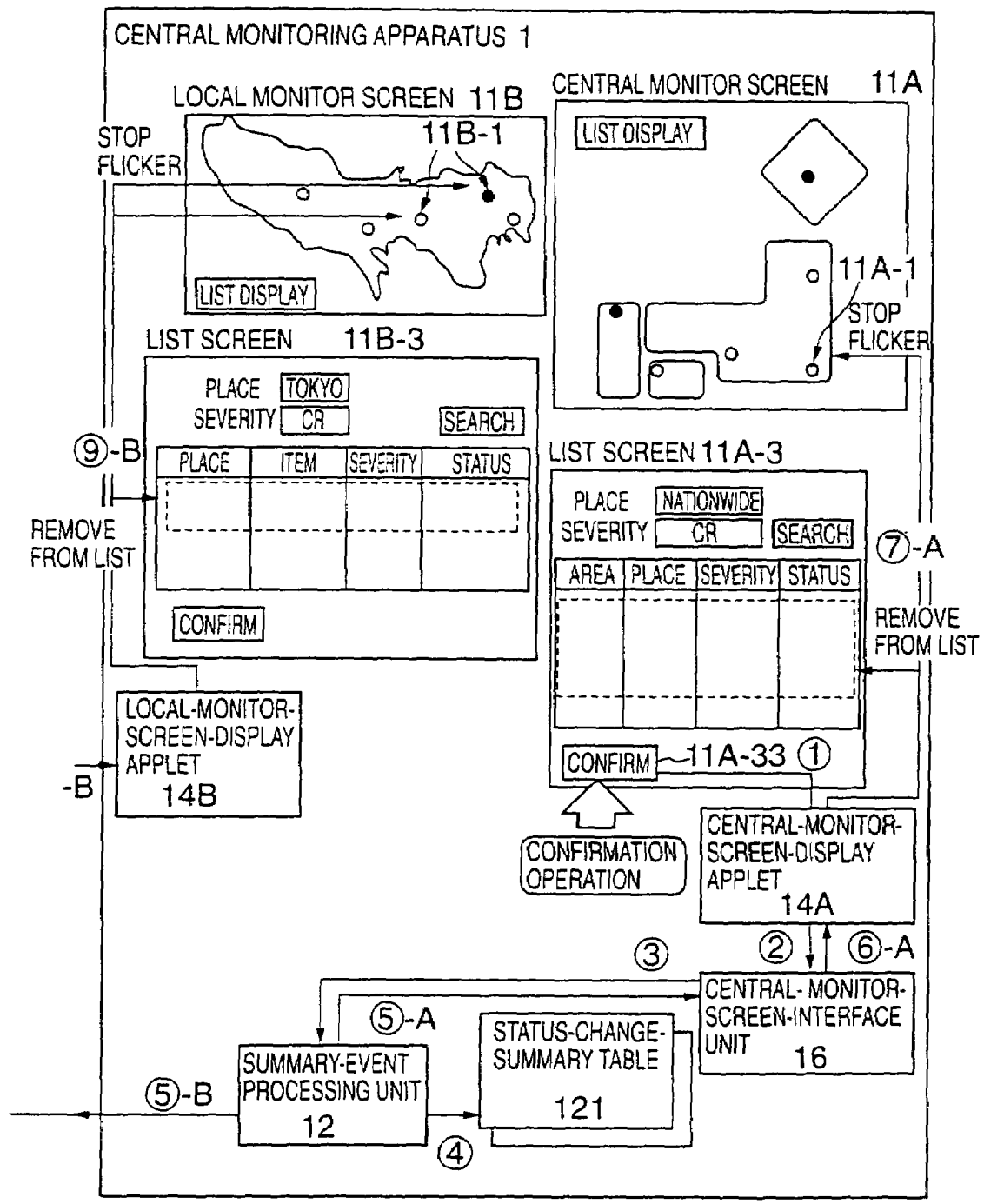
FIG. 9 is a process flow of a process performed by the central monitoring apparatus when a confirmation operation is carried out on a central monitor screen.
Figure 10:
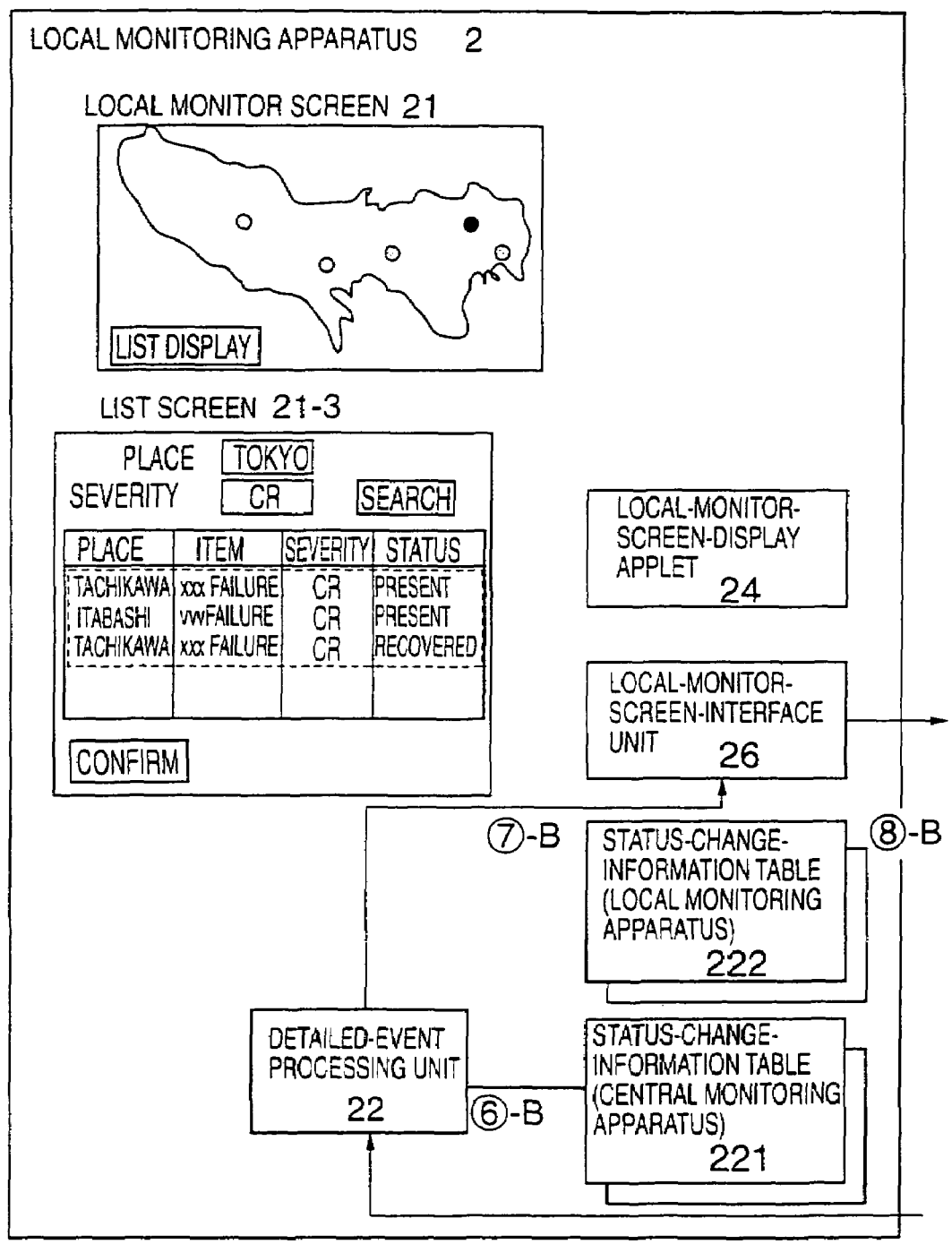
FIG. 10 is a process flow of a process performed by the local monitoring apparatus when a confirmation operation is carried out on the central monitor screen.

FIG. 9 is a process flow of a process performed by the central monitoring apparatus when a confirmation operation is carried out on the central monitor screen. FIG. 10 is a process flow of a process performed by the local monitoring apparatus 2 when a confirmation is carried out on the central monitor screen.

When the confirmation button 11A-33 is clicked on the list screen 11A-3 associated with the central monitor screen 11A of the central monitoring apparatus 1, the central-monitor-screen-display applet 14A detects the click (step ST1). The central-monitor-screen-display applet 14A sends a request to the summary-event processing unit 12 via the central-monitor-screen-interface unit 16 so as to request a confirmation process to be performed (steps ST2 and ST3).

Upon receiving the request for a confirmation process, the summary-event processing unit 12 erases relevant status-change information from the status-change-summary table 121 in accordance with the contents of the request (step ST4). Further, the summary-event processing unit 12 sends a response acknowledging the status-change confirmation to the central-monitor-screen-display applet 14A via the central-monitor-screen-interface unit 16 (steps ST5-A and ST6-A), and sends a message indicative of status-change confirmation to the local monitoring apparatus 2 via the network (step ST5-B).

Having received the response acknowledging the status-change confirmation, the central-monitor-screen-display applet 14A erases the confirmed information from the list screen 11A-3 showing status-change information, and stops flickering of the area icon 11A-1 that corresponds to the confirmed status-change information (step ST7-A).

Having received the message indicative of status-change confirmation via the network, the detailed-event processing unit 22 of the local monitoring apparatus 2 erases the confirmed status-change information from the status-change-information table 221 for the central monitoring apparatus in accordance with the contents of the message (step ST6-B), and sends a message indicative of status-change confirmation to the local-monitor-screen-display applet 14B of the central monitoring apparatus 1 via the local-monitor-screen-interface unit 26 (steps ST7-B and ST8).

In response to the message indicative of status-change confirmation, the local-monitor-screen-display applet 14B of the central monitoring apparatus 1 erases the confirmed status-change information from the list screen 11B-3 that shows status-change information in association with the local monitor screen 11B, and stops flickering of the communication-apparatus icon 11B-1 that represents the communication apparatus for which status-change information was confirmed (step ST9).

In this manner, the present invention manages and controls the status-change-information tables 221 and 222 stored in the local monitoring apparatus 2 separately for different monitoring apparatuses, and attaches data indicative of an operated monitoring apparatus to a request for a confirmation process, thereby preventing a confirmation operation performed on a monitoring apparatus from affecting a monitor screen of another monitoring apparatus. Further, when a confirmation operation is performed at the central monitoring apparatus 1, a request for a confirmation process is transmitted to the detailed-event processing unit 22 of the local monitoring apparatus 2 via the network, resulting in updating of the status-change-information table 221 for the central monitoring apparatus. This insures that the central monitor screen 11A and the local monitor screen 11B both displayed on the central monitoring apparatus 1 are synchronized with each other in terms of status of status-change confirmation, keeping consistency of displayed contents therebetween.

Namely, when status changes are confirmed by using the list 11B-3 associated with the local monitor screen 11B of the central monitoring apparatus 1, flickering of an area icon 11A-1 shown on the central monitor screen 11A will also be stopped where the area icon corresponds to an area having all the status changes thereof being conformed through the confirmation operation. At the same time, the corresponding status-change information is also erased from the list 11A-3 associated with the central monitor screen 11A.

On the other hand, when status changes are confirmed by using the list 11A-3 associated with the central monitor screen 11A of the central monitoring apparatus 1, flickering of communication-apparatus icons 11B-1 shown on the local monitor screen 11B will also be stopped where the communication-apparatus icons correspond to communication apparatuses having all the status changes thereof being conformed through the confirmation operation. At the same time, the corresponding status-change information is also erased from the list 11B-3 associated with the local monitor screen 11B.

When a confirmation operation is performed by clicking the confirmation button 21-33 or 11B-33 on the list screen 21-3 of the local monitoring apparatus 2 or the list screen 11B-3 of the central monitoring apparatus 1, information about the confirmation operation is delivered to the detailed-event processing unit 22 through the local-monitor-screen-interface unit 26 from either the local-monitor-screen-display applet 24 of the local monitoring apparatus 2 or the local-monitor-screen-display applet 14B of the central monitoring apparatus 1. By checking the delivered information, the detailed-event processing unit 22 identifies the apparatus on which the confirmation operation has been performed, and updates a relevant one of the status-change-information table 221 and the status-change-information table 222. Updated contents are then sent to the summary-event processing unit 12 of the central monitoring apparatus 1.

Accordingly, the local monitor screen 21 and the list screen 21-3 of the local monitoring apparatus 2 are independent of the local monitor screen 11B and the list screen 11B-3 of the central monitoring apparatus 1, providing separate control with respect to status-change-confirmation operation.

Namely, when a confirmation operation is performed on the list screen 21-3 of the local monitoring apparatus 2, this operation does not affect flickering shown on the local monitor screen 11B of the central monitoring apparatus 1. By the same token, when a confirmation operation is performed on the local-monitor list screen 11B-3 of the central monitoring apparatus 1, this confirmation operation has no effect on flickering shown on the local monitor screen 21 of the local monitoring apparatus 2.

In the following, item-wise control of the status-change information will be described.

The status-change-information tables 221 and 222 are controlled such that status-change information is given ordinal numbers on a severity-wise basis. Further, the list screens of the local monitor screen and the central monitor screen lists status changes according to classification by severity or classification by areas. An administrator performs a confirmation operation after visually checking displayed status-change information. In response, a screen-display applet for a local monitor screen or a screen-display applet for a central monitor screen informs the detailed-event processing unit 22 or the summary-event processing unit 12 of a classification type of the displayed status-change information and the highest ordinal number given within this classification.

The detailed-event processing unit 22 receives the classification type and the highest ordinal number within this classification when they are sent from the local-monitor-screen-display applet, and updates the status-change-information table 221 or 222 that stores status changes according to the classification and ordinal numbers. After the updating, the detailed-event processing unit 22 notifies the local-monitor-screen-display applet of the updating of the status-change-information table 221 or 222. In response, the local-monitor-screen-display applet updates the local monitor screen.

In the same manner, the summary-event processing unit 12 receives the classification type and the highest ordinal number within this classification when they are sent from the local-monitor-screen-display applet, and updates the status-change-summary table 121 that stores status changes according to the classification and ordinal numbers. After the updating, the summary-event processing unit 12 notifies the local-monitor-screen-display applet of the updating of the status-change-summary table 121. In response, the local-monitor-screen-display applet updates the local monitor screen.

Let us assume that a status-change-information table stores status changes as shown in Table 6.

TABLE 6

| Num. in Severity | Num. of Change | Place | Item | Severity | Status |
|---|---|---|---|---|---|
| 1 | 1 | Tachikawa | Equipment A Failure | CR | present |
| 2 | 1 | Tachikawa | Equipment B Failure | CR | present |
| 3 | 1 | Tachikawa | Equipment A Hitch | CR | recovered |
| 4 | 2 | Tachikawa | Equipment B Hitch | CR | recovered |
| 5 | 3 | Tachikawa | Equipment C Failure | CR | present |
| 6 | 4 | Tachikawa | Equipment C Hitch | CR | recovered |

Number in Severity indicates a number that is counted up each time a new status change is reported with respect to a given severity level. Number of Change indicates a number that is counted up each time the macro status-change information of a given severity level becomes "present" or "recovered". Namely, the number of change is not counted up even if there is a status change of "present" or "recovered" as long as there is an item being "present" in the given severity level.

The local monitoring apparatus 2 informs the central monitoring apparatus 1 of status-change information as shown in Table 6. Let us assume that the central monitoring apparatus 1 has been so far informed of a status change up to Number in Severity 1, as shown in Table 7.

TABLE 7

| Num. in Severity | Num. of Change | Place | Item | Severity | Status |
|---|---|---|---|---|---|
| 1 | 1 | Tachikawa | Equipment A Failure | CR | present |

If an administrator confirms the status change at this point of time, the central monitoring apparatus 1 sends the severity level CR and the ordinal number 1 counted within this severity level to the local monitoring apparatus 2. Then, the local monitoring apparatus 2 performs the following steps with respect to Table 6:

(1) identifying a status change having Number in Severity 1;
(2) finding Number of Change of the identified status change (i.e., 1 in this example);
(3) identifying all the status changes having the same Number of Change as that found above (i.e., the first three entries of Table 6); and
(4) erasing all the identified status changes In this manner, the present invention controls status-change information in a status-change-information table by classifying the information and assigning numbers within each classified group, so that an administrator can give partial confirmation within each classified group. Such partial confirmation means partial erasure of status-change information from the status-change-information table.

Further, the central monitoring apparatus 1 is provided with a means to inform the administrator only of monitored items that have severity levels higher than a predetermined severity level. In this configuration, the central monitor screen 11A and the local monitor screen 11B of the central monitoring apparatus 1 do not show status-change information with respect to items having severity levels no higher than the predetermined severity level. Details o this configuration will be described later with reference to FIG. 25 and FIG. 26.

The detailed-event processing unit 22 of the local monitoring apparatus 2 compares a severity level of a status change reported by a communication apparatus with the predetermined severity level, and decides whether to display the reported status change on the local monitor screen 11B of the central monitoring apparatus 1. If the status change is to be displayed, it is sent to the local-monitor-screen-display applet 14B of the central monitoring apparatus 1 via the local-monitor-screen-interface unit 26, resulting in the local-monitor-screen-display applet 14B displaying the status change on the local monitor screen 11B of the central monitoring apparatus 1.

In this manner, the present invention stores data indicative of the predetermined severity level in the central monitoring apparatus 1 and the local monitoring apparatus 2, and determines based on the predetermined severity level whether a status change is to be reflected by the local monitor screen 11B of the central monitoring apparatus 1. The present invention can thus narrow a range of items displayed on the central monitor screen 11A and the local monitor screen 11B of the central monitoring apparatus 1.

The central monitoring apparatus 1 simultaneously monitors a plurality of local monitoring apparatuses 2. It is difficult, however, to display all the status-change information received from the local monitoring apparatuses 2. Use of a severity level threshold makes it possible to display only the items of an urgent nature. In this configuration, the local monitor screen 11B of the central monitoring apparatus 1 displays status-change information that have severity levels higher than the predetermined severity-level threshold set by the central monitoring apparatus 1, whereas the local monitor screen 21 of the local monitoring apparatus 2 displays status-change information unaffected by the severity-level threshold.

In the following, a description will be given with regard to recordation of control operation in the local monitoring apparatus and in the central monitoring apparatus.

Figure 28:
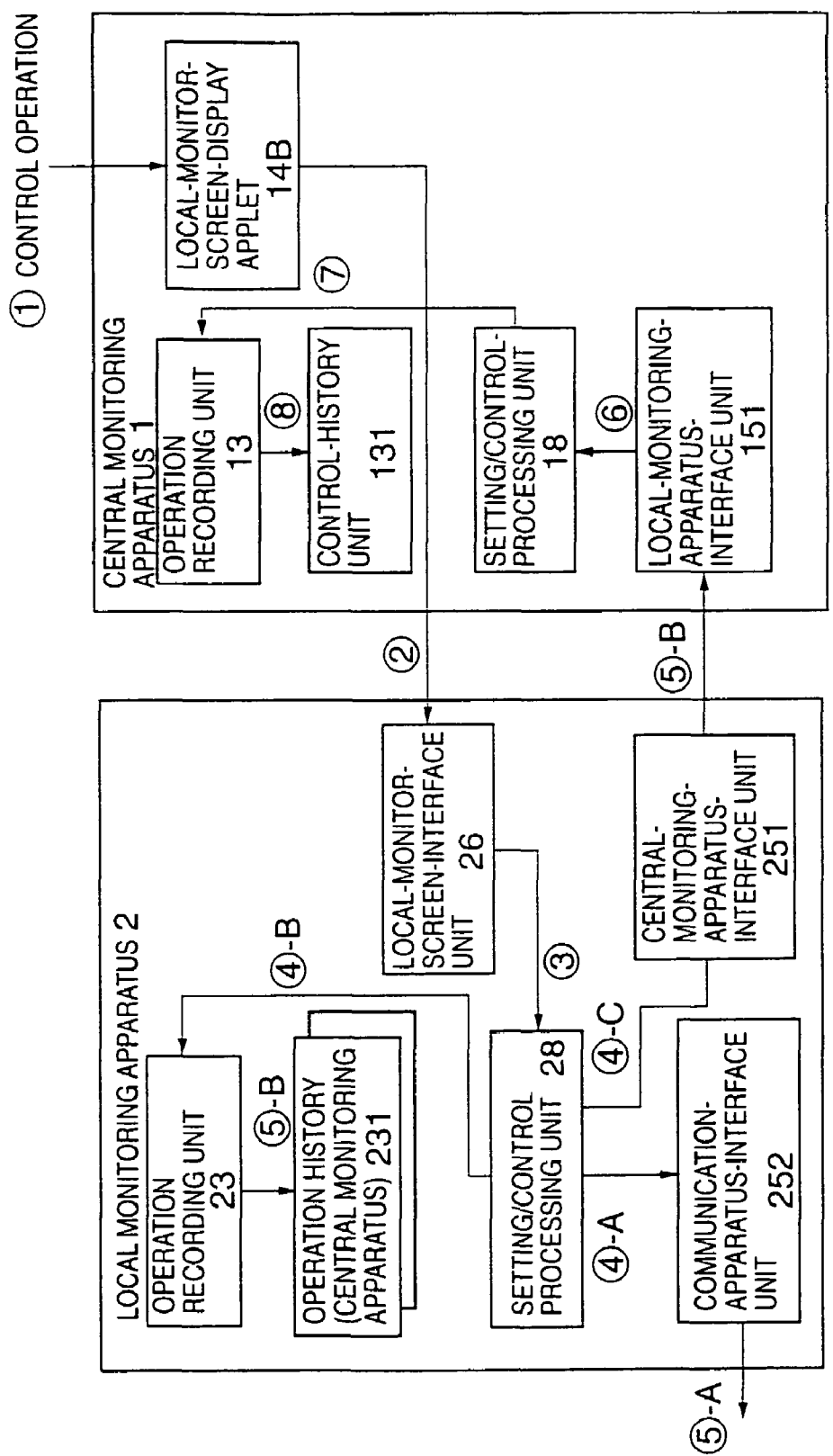
FIG. 28 is a process flow of a process performed when a control operation is performed on a local monitor screen of the central monitoring apparatus.
Figure 29:
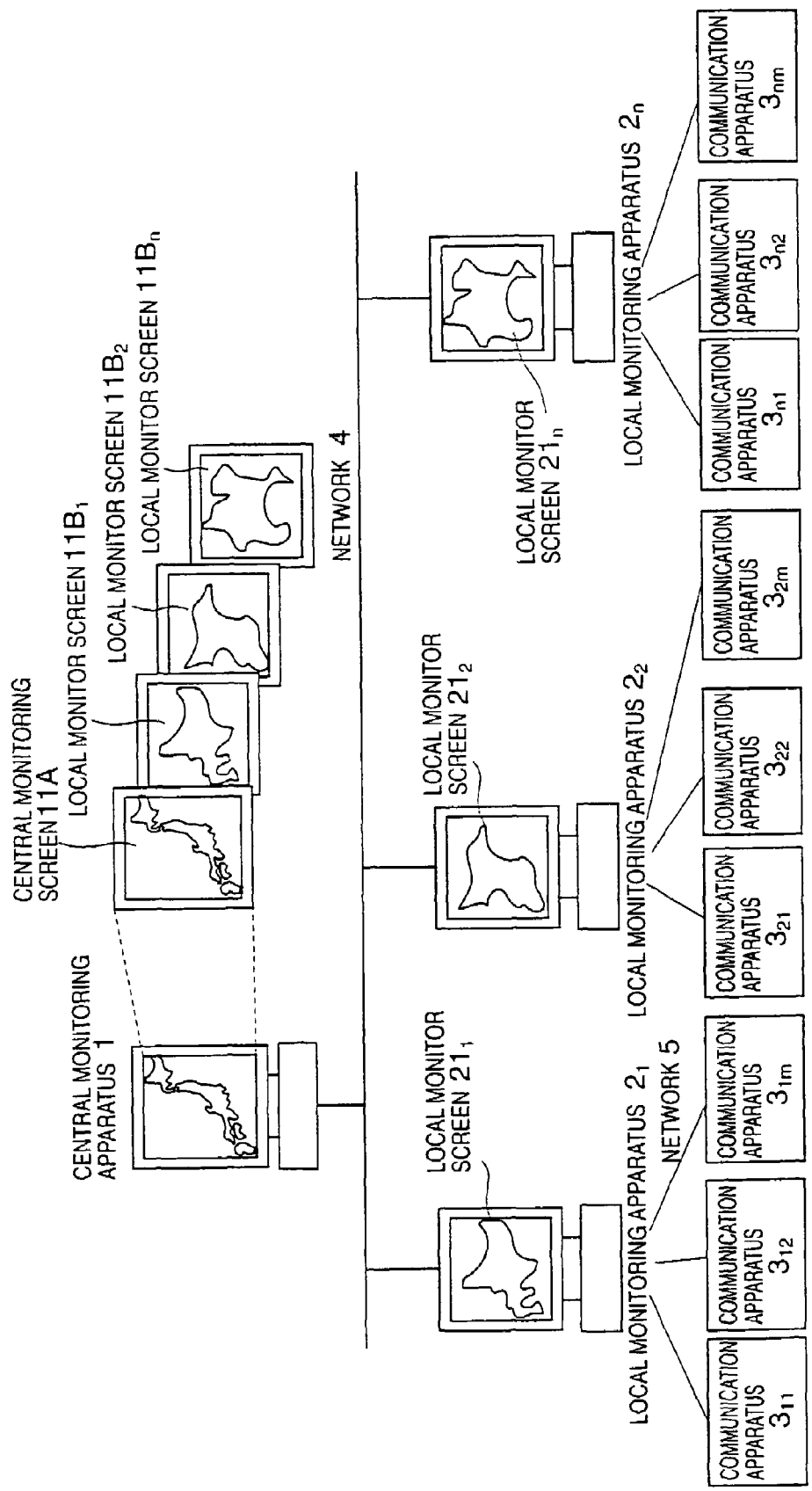
FIG. 29 is an illustrative drawing showing a configuration of a multi-level management system.

As shown in FIG. 28, the local monitoring apparatus 2 includes a setting/control-processing unit 28. The setting/control-processing unit 28 receives data of control operation performed by the central monitoring apparatus 1 from the local-monitor-screen-display applet 14B of the central monitoring apparatus 1 via the local-monitor-screen-interface unit 26 of the local monitoring apparatus 2, and sends the data to a communication apparatus.

The setting/control-processing unit 28 also receives a response to the control operation when it is sent from the communication apparatus. The setting/control-processing unit 28 sends the data of control operation and the response thereto to the operation recording unit 23. The operation recording unit 23 stores the data of control operation and the response thereto in a control-history unit 231 of the local monitoring apparatus 2. Further, the setting/control-processing unit 28 checks whether the control operation was carried out by the local monitoring apparatus 2 or carried out by the central monitoring apparatus 1. If it was carried out by the central monitoring apparatus 1, the setting/control-processing unit 28 sends the data of control operation and the response thereto to a setting/control-processing unit 18 of the central monitoring apparatus 1.

The setting/control-processing unit 18 of the central monitoring apparatus 1 forwards the data of control operation and the response thereto to the operation recording unit 13 of the central monitoring apparatus 1. The operation recording unit 13 stores the data of control operation and the response thereto in a control-history unit 131.

In this manner, even if the control operation is performed on the local monitor screen 11B of the central monitoring apparatus 1, it is the local monitoring apparatus 2 which performs actual control processing directed to the local monitoring apparatus 2 or to the communication apparatuses $3_{11}$ through $3_{nm}$. History information on the control operation and the response thereto, however, are transmitted from the local monitoring apparatus 2 to the central monitoring apparatus 1, so that the central monitoring apparatus 1 stores therein the history information on the control operation performed by the administrator of the central monitoring apparatus 1. This configuration makes it possible to record every operation performed by the central monitoring apparatus 1.

Figure 11:
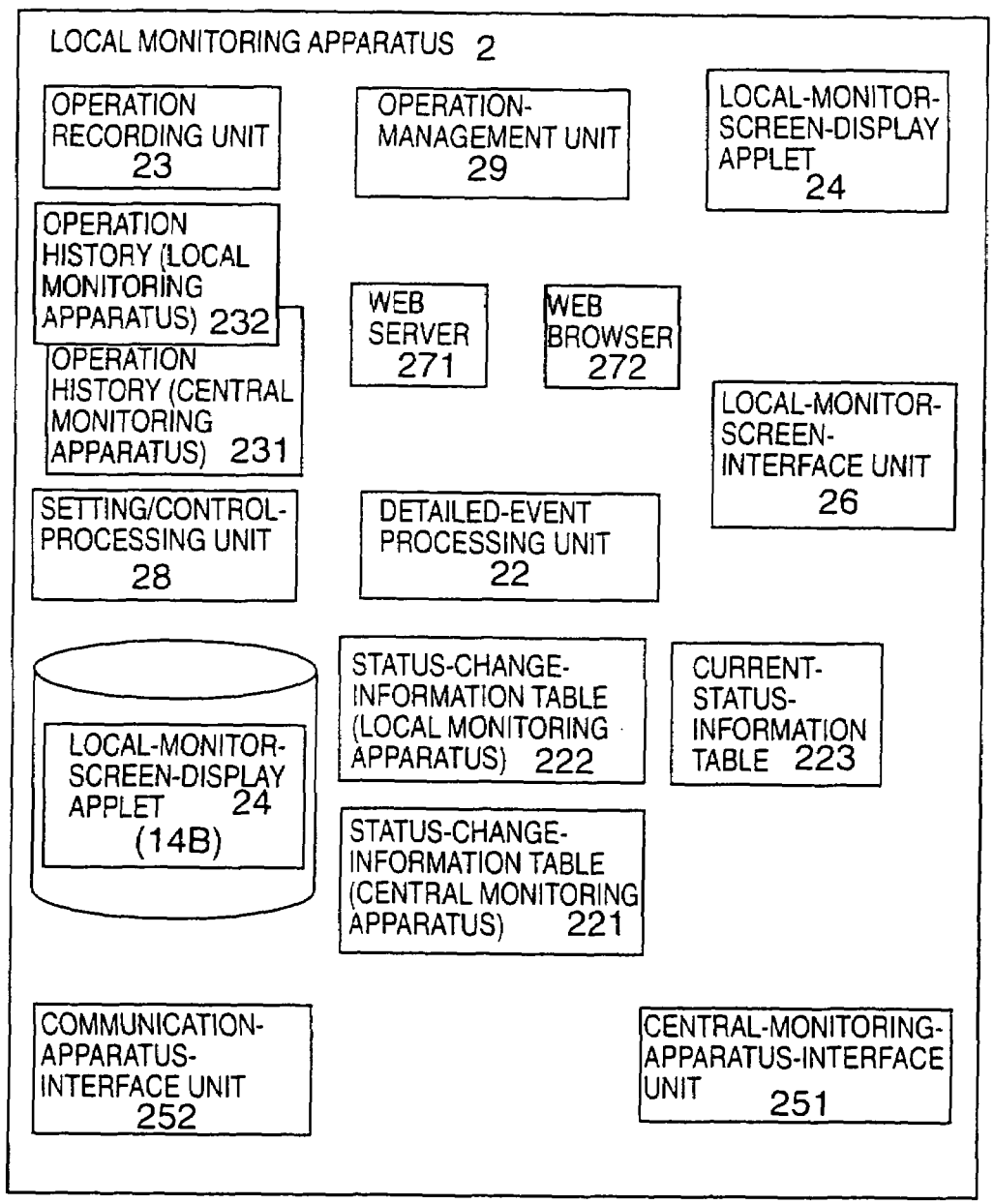
FIG. 11 is a block diagram showing functions of the local monitoring apparatus.

FIG. 11 is a block diagram showing functions of the local monitoring apparatus 2.

As shown in FIG. 11, the local monitoring apparatus 2 includes a Web server 271, a Web browser 272, and the operation recording unit 23. The operation recording unit 23 performs a function of recording operation history regarding control operations, option-setting operations, etc.

The local monitoring apparatus 2 further includes the local-monitor-screen-display applet 24 (14B), which provides functions of displaying the local monitor screen 21 (11B) and interacting with an administrator when the administrator performs various operations. The local-monitor-screen-display applet is initially stored in a hard-drive of the local monitoring apparatus 2, and is activated by the Web server 271 and the Web browser 272 or 172 in response to a user operation for displaying a local monitor screen on the local monitoring apparatus 2 or on the central monitoring apparatus 1. If the user operation for displaying a screen is performed on the local monitoring apparatus 2, the local-monitor-screen-display applet 24 runs on the local monitoring apparatus 2. If the user operation for displaying a screen is performed on the central monitoring apparatus 1, the local-monitor-screen-display applet 14B runs on the central monitoring apparatus 1.

An applet is a program written in Java codes, and is downloaded from a Web server to a Web browser when it is to be used. The reason why applets are used for the display purpose in the preferred embodiments of the present invention is that use of applets makes it possible for an apparatus to display and let a user operate on a remote screen. In this configuration, therefore, the central monitoring apparatus can provide monitor-and-control interface that is the same as that used with screens displayed on the local monitoring apparatus.

With reference to FIG. 11 again, the setting/control-processing unit 28 provides a function of receiving setting/control operation performed by an administrator and a function of carrying out relevant setting/control processing. Further, the setting/control-processing unit 28 stores a predetermined severity-level threshold that is informed by the central monitoring apparatus 1. The local-monitor-screen-interface unit 26 provides interface between the local-monitor-screen-display applet 24 or 14B and various units of the local monitoring apparatus 2.

When receiving a request from the local-monitor-screen-display applet 24 or 14B, the local-monitor-screen-interface unit 26 transfers the request to a relevant processing unit within the local monitoring apparatus 2. When receiving a response to the request from a processing unit of the local monitoring apparatus 2, the local-monitor-screen-interface unit 26 transfers the response to either the local monitoring apparatus 2 or the central monitoring apparatus 1 that issued the request. Upon receiving a message from a processing unit of the local monitoring apparatus 2, the local-monitor-screen-interface unit 26 forwards the message to the local-monitor-screen-display applet 24 or 14B.

The detailed-event processing unit 22 provides a function of controlling a current monitor status and a status change of each monitored item with respect to each communication apparatus, and, also, provides a function of controlling a status change in the summary information collected for a given area that is under the control of the local monitoring apparatus 2.

When the detailed-event processing unit 22 detects a status change of a monitored item in response to an event message sent from the communication apparatuses $3_{11}$ through $3_{nm}$, the detailed-event processing unit 22 sends a message indicative of the status change to the local-monitor-screen-display applet 24 or 14B. When detecting a status change in the summary information regarding the local area that is under the control of the local monitoring apparatus 2, the detailed-event processing unit 22 sends a message indicative of the status change to the central monitoring apparatus 1.

Moreover, the detailed-event processing unit 22 receives a request for transfer of current monitor statuses and status changes when the request is sent from the local-monitor-screen-display applet 24 or 14B. Upon receipt of the request, the detailed-event processing unit 22 sends requested information to the local-monitor-screen-display applet 24 or 14B. Management and control in this operation are attended to by using the status-change-information tables 221 and 222 and a current-status-information table 223.

The current-status-information table 223 is used for controlling a current status ("present" or "recovered") of each monitored item with respect to each communication apparatus. The current-status-information table 223 is updated by the detailed-event processing unit 22 each time an event message is received from a communication apparatus. When the local monitor screen 21 or 11B is displayed for the first time, the current-status-information table 223 is referred to in order to determine a display color for each communication-apparatus icon 21-1 or 11B-1.

The status-change-information tables 221 and 222 are used to monitor and control a time of occurrence of a status change, a nature of a status change ("present" or "recovered"), etc., with respect to each monitored item that experienced a status change. Generation and updating of the status-change-information tables 221 and 222 are attended to by the detailed-event processing unit 22. The detailed-event processing unit 22 generates a table for a monitoring apparatus when an administrator starts up this monitoring apparatus. Thereafter, each time a communication apparatus sends an event message, the detailed-event processing unit 22 updates the status-change-information tables 221 and 222 accordingly. When an administrator performs a confirmation operation, the status changes that are confirmed are removed from a corresponding one of the status-change-information tables 221 and 222.

A communication-apparatus-interface unit 252 provides interface between communication apparatuses and the processing units of the local monitoring apparatus 2. The communication-apparatus-interface unit 252 receives information from the communication apparatuses. If the received information is an event message, the communication-apparatus-interface unit 252 forwards the event message to the detailed-event processing unit 22.

A central-monitoring-apparatus-interface unit 251 provides interface between the central monitoring apparatus 1 and the processing units of the local monitoring apparatus 2. The central-monitoring-apparatus-interface unit 251 forwards information to the central monitoring apparatus 1 when receiving the information from a processing unit of the local monitoring apparatus 2, and forwards what is received from the central monitoring apparatus 1 to a relevant processing unit of the local monitoring apparatus 2. When information received from the central monitoring apparatus 1 is a request for option setting or a request for control operation, this information is forwarded to the setting/control-processing unit 28. If information received from the central monitoring apparatus 1 is a message of operation monitoring, it is sent to the detailed-event processing unit 22.

An operation-management unit 29 receives data of start operation performed by an administrator, and informs the detailed-event processing unit 22 of a start of status-change monitoring operation that is commenced in response to the administrator's start operation.

Figure 12:
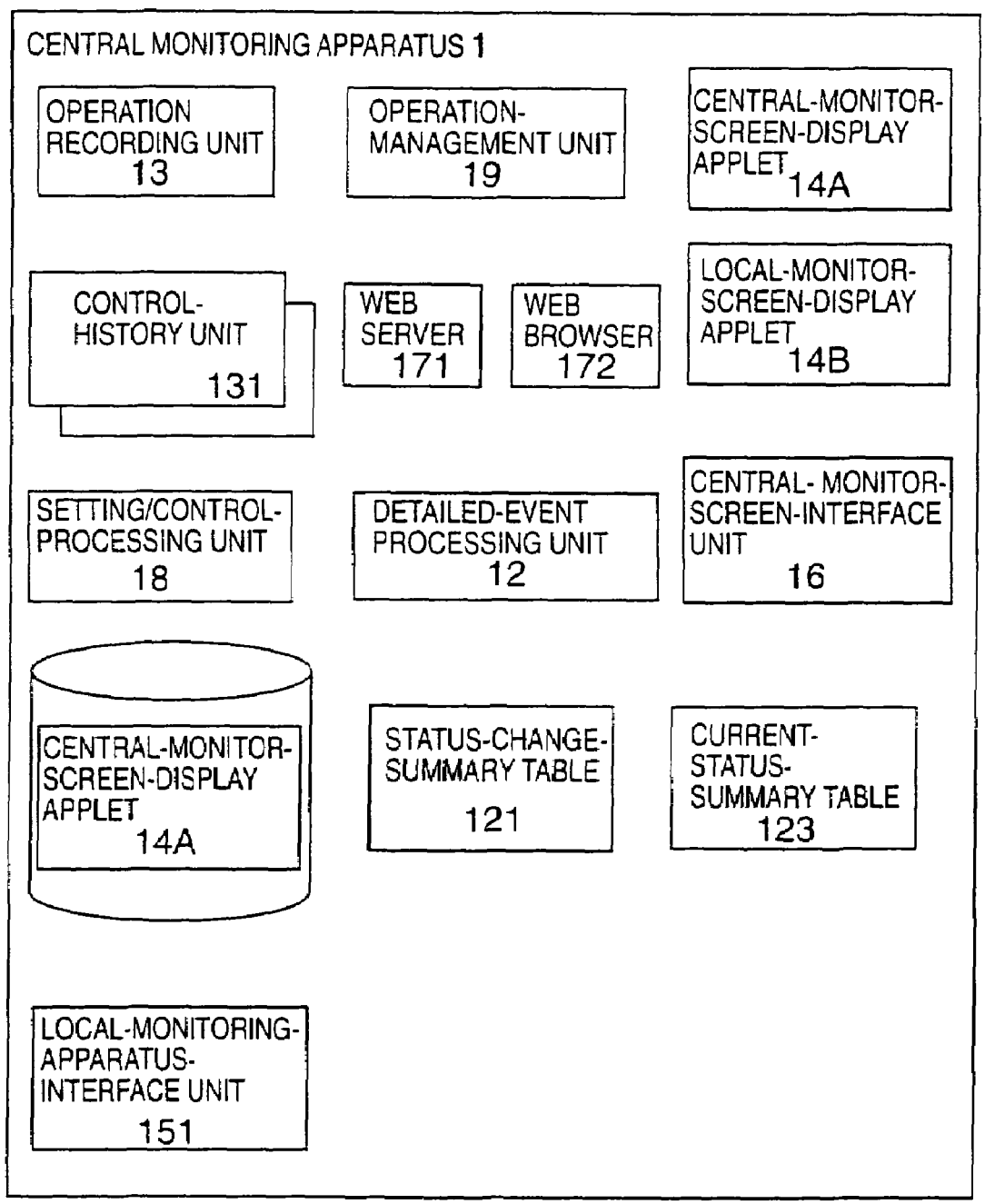
FIG. 12 is a block diagram showing functions of the central monitoring apparatus.

FIG. 12 is a block diagram showing functions of the central monitoring apparatus 1.

As shown in FIG. 12, the central monitoring apparatus 1 includes a Web server 171, a Web browser 172, and the operation recording unit 13. The operation recording unit 13 performs a function of recording operation history regarding control operations, option-setting operations, etc., performed by an administrator of the central monitoring apparatus 1.

The central-monitor-screen-display applet 14A serves to display the central monitor screen 11A and interact with an administrator when the administrator performs various operations. The central-monitor-screen-display applet 14A is initially stored in a hard-drive of the central monitoring apparatus 1, and is activated by the Web server 171 and the Web browser 172 in response to a user operation performed for the purpose of displaying the central monitor screen 11A. The setting/control-processing unit 18 provides a function of receiving setting/control operation performed by an administrator, and further provides a function of carrying out relevant setting/control processing.

The central-monitor-screen-interface unit 16 provides interface between the central-monitor-screen-display applet 14A and various units of the central monitoring apparatus 1. When receiving a request from the central-monitor-screen-display applet 14A, the central-monitor-screen-interface unit 16 transfers the request to a relevant processing unit within the central monitoring apparatus 1. When receiving a response to the request from a processing unit of the central monitoring apparatus 1, the central-monitor-screen-interface unit 16 transfers the response to the central-monitor-screen-display applet 14A.

The summary-event processing unit 12 provides a function of controlling a current monitor status and a status change of each local area. When the summary-event processing unit 12 detects a status change of a monitored status based on an event message sent from a communication apparatus, the summary-event processing unit 12 sends a message indicative of the status change to the central-monitor-screen-display applet 14A. When receiving a request for transfer of current monitor statuses and status changes from the central-monitor-screen-display applet 14A, the summary-event processing unit 12 sends requested information to the central-monitor-screen-display applet 14A.

Management and control of this operation are attained based on the status-change-summary table 121 and a current-status-summary table 123. The current-status-summary table 123 is used for controlling a current status of each local area. The current-status-summary table 123 is updated by the summary-event processing unit 12 each time a message indicative of status change is received from the local monitoring apparatus 2. When the central monitor screen 11A is displayed for the first time, the current-status-summary table 123 is referred to in order to determine a display color for each area icon 11A-1.

The status-change-summary table 121 is used to monitor and control a time of occurrence of a status change, a nature of a status change ("present" or "recovered"), etc., with respect to each local area. Generation of the status-change-summary table 121 is attended to by the summary-event processing unit 12 at the time of a start of operation when the operation is launched by an administrator. Thereafter, each time the local monitoring apparatus 2 sends a message indicative of status change, the summary-event processing unit 12 updates the status-change-summary table 121 accordingly. When an administrator performs a confirmation operation, the status changes that are confirmed are removed from the status-change-summary table 121.

A local-monitoring-apparatus-interface unit 151 provides interface between the local monitoring apparatus 2 and the processing units of the central monitoring apparatus 1. When information received from the local monitoring apparatus 2 is a message indicative of status change, the local-monitoring-apparatus-interface unit 151 forwards the event message to the summary-event processing unit 12.

The setting/control-processing unit 18 provides functions of receiving setting/control operation performed by an administrator and of carrying out relevant setting/control processing. Further, the setting/control-processing unit 18 receives a severity-level threshold from the central-monitor-screen-display applet 14A via the central-monitor-screen-interface unit 16, and stores the severity-level threshold in a severity-level-setting unit (not shown).

An operation-management unit 19 receives data of a start operation performed by an administrator, and informs the summary-event processing unit 12 of a start of status-change monitoring operation that is commenced in response to the administrator's start operation. Further, the operation-management unit 19 reports the start of status-change monitoring operation to the detailed-event processing unit 22 of the local monitoring apparatus 2 via the local-monitoring-apparatus-interface unit 151.

Figure 13:
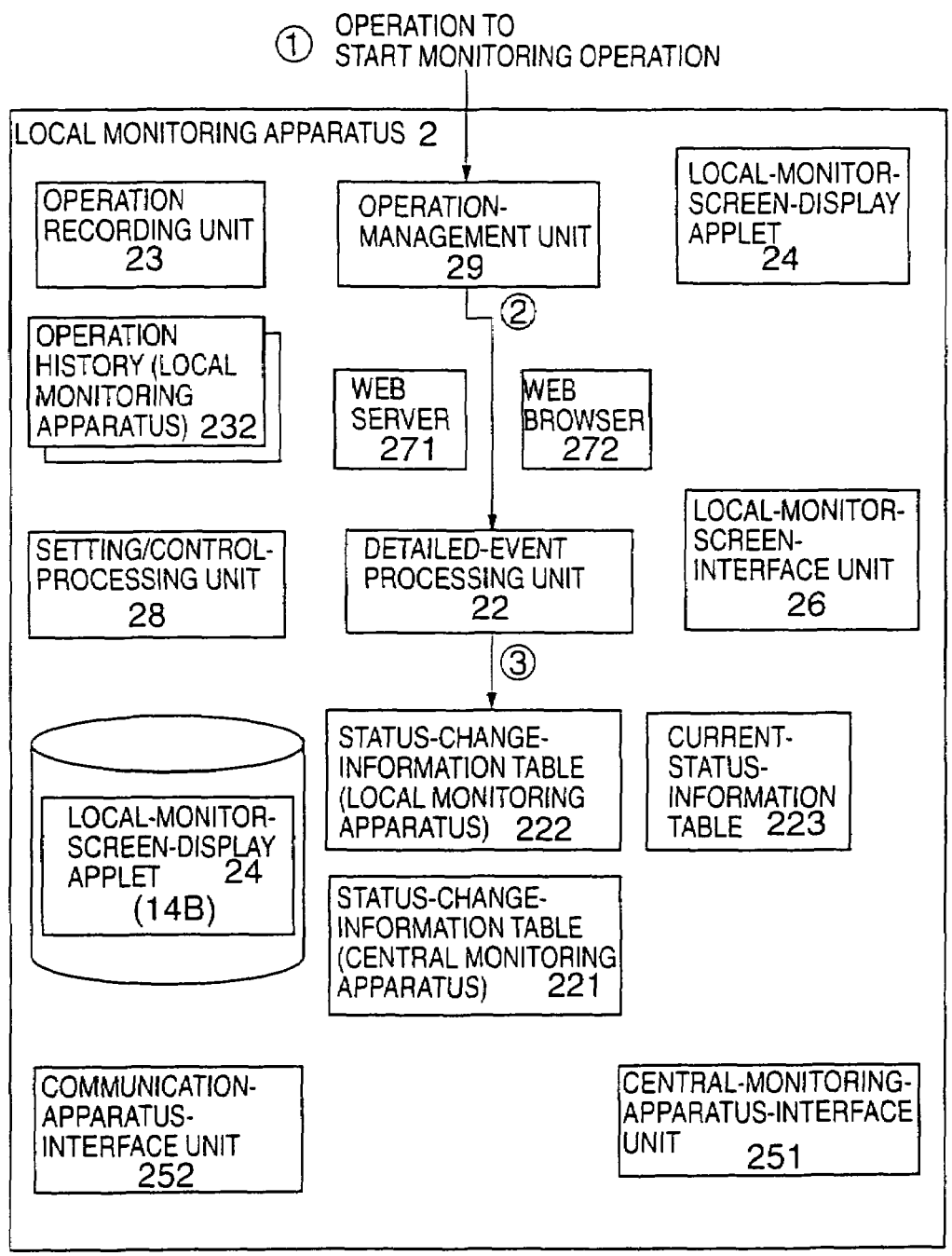
FIG. 13 is a process flow of a process performed by the local monitoring apparatus at a time of a start of operation.

FIG. 13 is a process flow of a process performed by the local monitoring apparatus at a time of a start of operation.

When detecting a monitoring-start operation performed by an administrator on the local monitoring apparatus 2 (step ST1), the operation-management unit 29 informs the detailed-event processing unit 22 of a start of monitoring operation (step ST2).

Having received the message indicative of a start of monitoring operation from the operation-management unit 29, the detailed-event processing unit 22 generates the status-change-information table 222 for a local monitoring apparatus (step ST3). Thereafter, when a status change occurs, the status-change-information table 222 will be updated, indicating an ongoing status of local monitoring operation.

Figure 14:
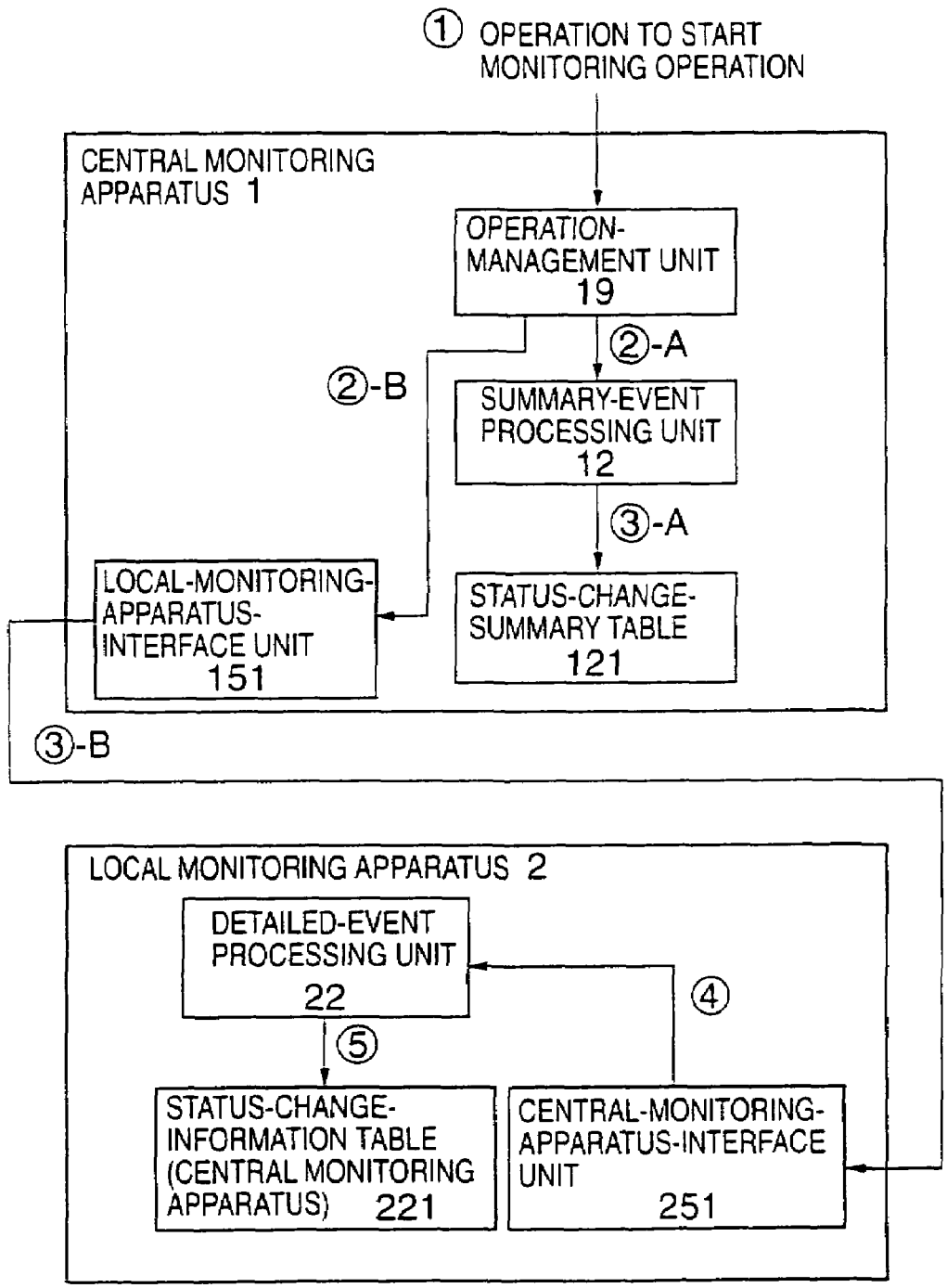
FIG. 14 is a process flow of a process performed at a time when a start operation is carried out on the central monitoring apparatus.

FIG. 14 is a process flow of a process performed at a time when a start operation is carried out on the central monitoring apparatus.

When detecting a monitoring-start operation performed by an administrator on the central monitoring apparatus 1 (step ST1), the operation-management unit 19 informs the summary-event processing unit 12 of a start of monitoring operation (step ST2-A), and, also, notifies the local monitoring apparatus 2 of the start of monitoring operation by sending a notice via the local-monitoring-apparatus-interface unit 151 (steps ST2-B and ST3-B). In response to the message received from the operation-management unit 19, the summary-event processing unit 12 generates the status-change-summary table 121 (step ST3-A).

Having received the notice from the central monitoring apparatus 1 through the central-monitoring-apparatus-interface unit 251 (step ST4), the detailed-event processing unit 22 of the local monitoring apparatus 2 generates the status-change-information table 221 for a central monitoring apparatus (step ST5). Thereafter, when a status change occurs, the status-change-information table 221 for a central monitoring apparatus and the status-change-summary table 121 will be updated, indicating an ongoing status of central monitoring operation.

Once the central monitoring apparatus 1 and the local monitoring apparatus 2 are engaged in operation, the status-change-summary table 121 is generated in the central monitoring apparatus 1. In the local monitoring apparatus 2, further, the status-change-information table 222 and the status-change-information table 221 are generated separately for the local monitoring apparatus 2 and the central monitoring apparatus 1.

Figure 15:
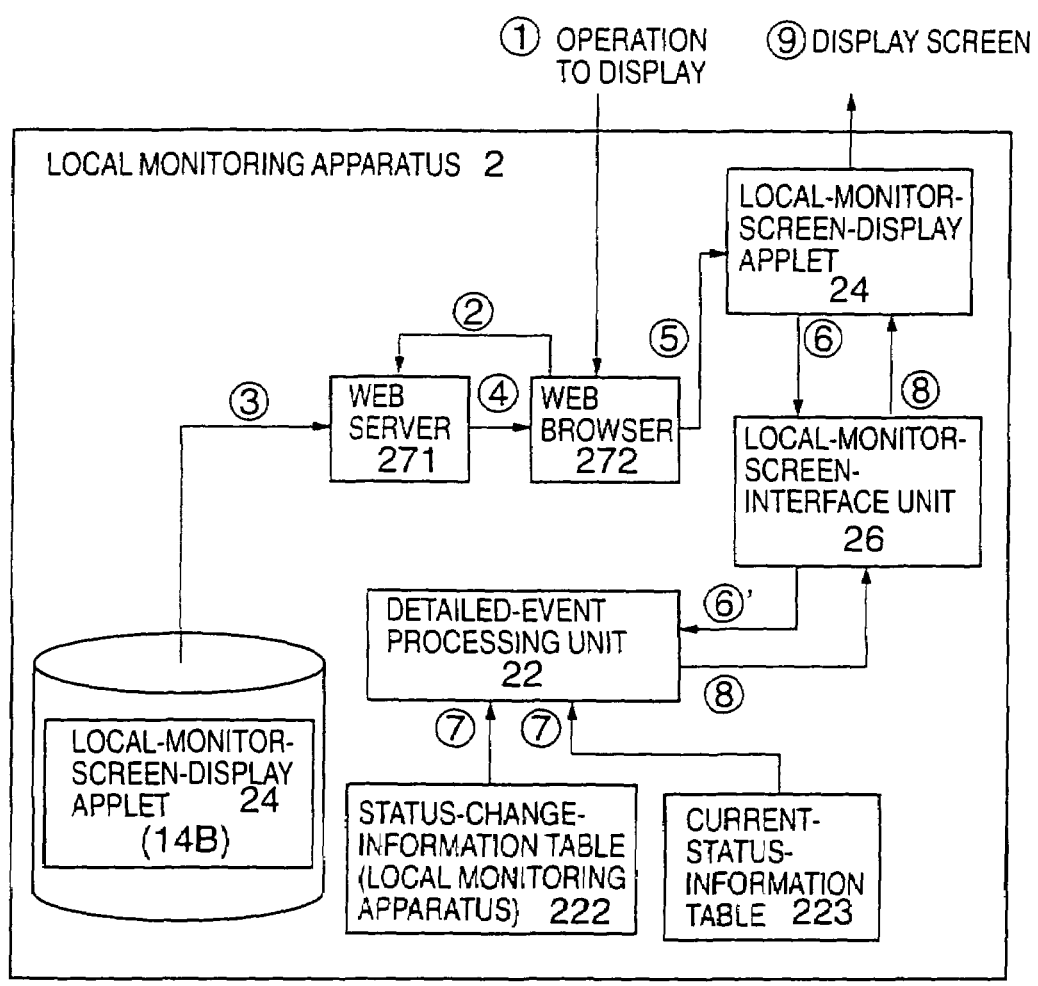
FIG. 15 is a process flow of a process performed by the local monitoring apparatus at a time when an operator operation for displaying a local-monitoring screen is carried out.

FIG. 15 is a process flow of a process performed by the local monitoring apparatus at a time when an operator operation for displaying a local-monitoring screen is carried out.

In the local monitoring apparatus 2, the Web browser 272 detects an operator operation for displaying a local monitor screen (step ST1), and requests the Web server 271 to display the local monitor screen (step ST2).

In response to the request, the Web server 271 reads the local-monitor-screen-display applet 24 and an HTML file defining the local monitor screen 21 (step ST3), and hands them to the Web browser 272 (step ST4). Having received the local-monitor-screen-display applet 24, the Web browser 272 activates the local-monitor-screen-display applet 24 (step ST5).

The local-monitor-screen-display applet 24 activated by the Web browser 272 sends a request message to the local-monitor-screen-interface unit 26 (step ST6), requesting current statuses and status changes that are necessary for the displaying of the local monitor screen 21.

In response to the request message, the local-monitor-screen-interface unit 26 forwards the request to the detailed-event processing unit 22 (step ST6'). Upon receiving the request, the detailed-event processing unit 22 reads the current-status-information table 223 and the status-change-information table 222 for a local monitoring apparatus (step ST7). The detailed-event processing unit 22 sends these tables to the local-monitor-screen-interface unit 26 as a response to the request (step ST8). Having received the response, the local-monitor-screen-interface unit 26 forwards the response to the local-monitor-screen-display applet 24 (step ST8').

Based on the response, the local-monitor-screen-display applet 24 selects a display color of a communication-apparatus icon 21-1 having an alarm on the local monitor screen 21 such that the display color corresponds to the highest severity level among various severity levels observed in the corresponding communication apparatus, and, also, makes the communication-apparatus icon 21-1 start flickering (step ST9).

Figure 16:
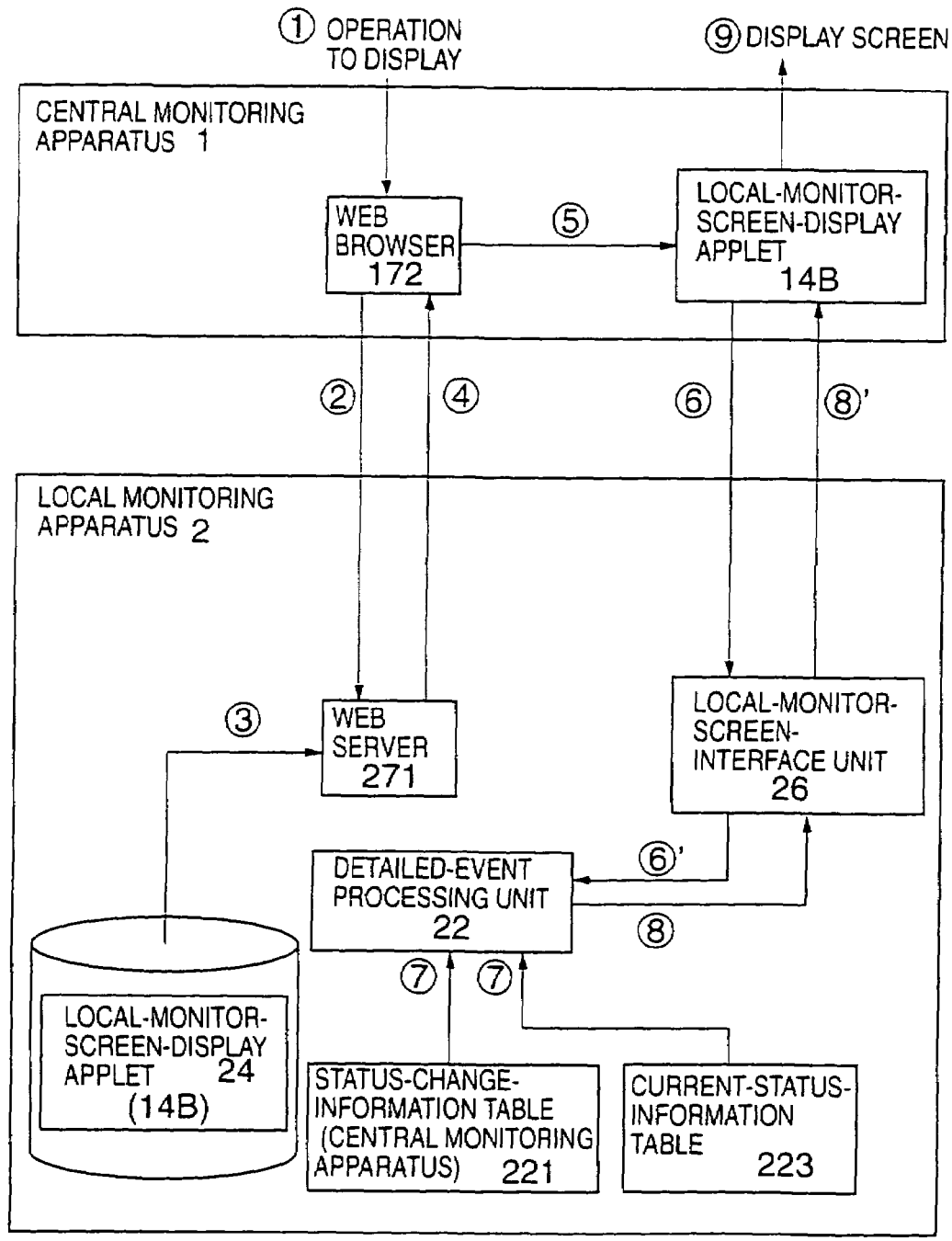
FIG. 16 is a process flow of a process performed at a time when an operator operation to display a local monitor screen is carried out on the central monitoring apparatus.

FIG. 16 is a process flow of a process performed at a time when an operator operation to display a local monitor screen is carried out on the central monitoring apparatus.

In the central monitoring apparatus 1, the Web browser 172 detects an operator operation for displaying a local monitor screen (step ST1). The Web browser 172 requests the Web server 271 of the local monitoring apparatus 2 to display the local monitor screen (step ST2).

In response to the request, the Web server 271 of the local monitoring apparatus 2 reads the local-monitor-screen-display applet 14B and an HTML file defining the local monitor screen 11B (step ST3), and hands them to the Web browser 172 of the central monitoring apparatus 1 (step ST4).

The Web browser 172 of the central monitoring apparatus 1 downloads the local-monitor-screen-display applet 14B and the HTML file defining the local monitor screen 11B, and, then, activates the local-monitor-screen-display applet 14B. The local-monitor-screen-display applet 14B of the central monitoring apparatus 1 activated by the Web browser 172 sends a request message to the local-monitor-screen-interface unit 26 (step ST6), requesting information necessary to display the local monitor screen 11B.

In response to the request message, the local-monitor-screen-interface unit 26 forwards the request to the detailed-event processing unit 22 (step ST6'). Upon receiving the request, the detailed-event processing unit 22 reads the current-status-information table 223 and the status-change-information table 221 for a central monitoring apparatus (step ST7). The detailed-event processing unit 22 sends these tables to the local-monitor-screen-interface unit 26 as a response to the request (step ST8). Having received the response, the local-monitor-screen-interface unit 26 forwards the response to the local-monitor-screen-display applet 14B of the central monitoring apparatus 1 (step ST8').

Based on the response, the local-monitor-screen-display applet 14B selects a display color of a communication-apparatus icon 11B-1 having an alarm on the local monitor screen 11B such that the display color corresponds to the highest severity level among various severity levels observed in the corresponding communication apparatus, and, also, makes the communication-apparatus icon 11B-1 start flickering (step ST9).

Figure 17:
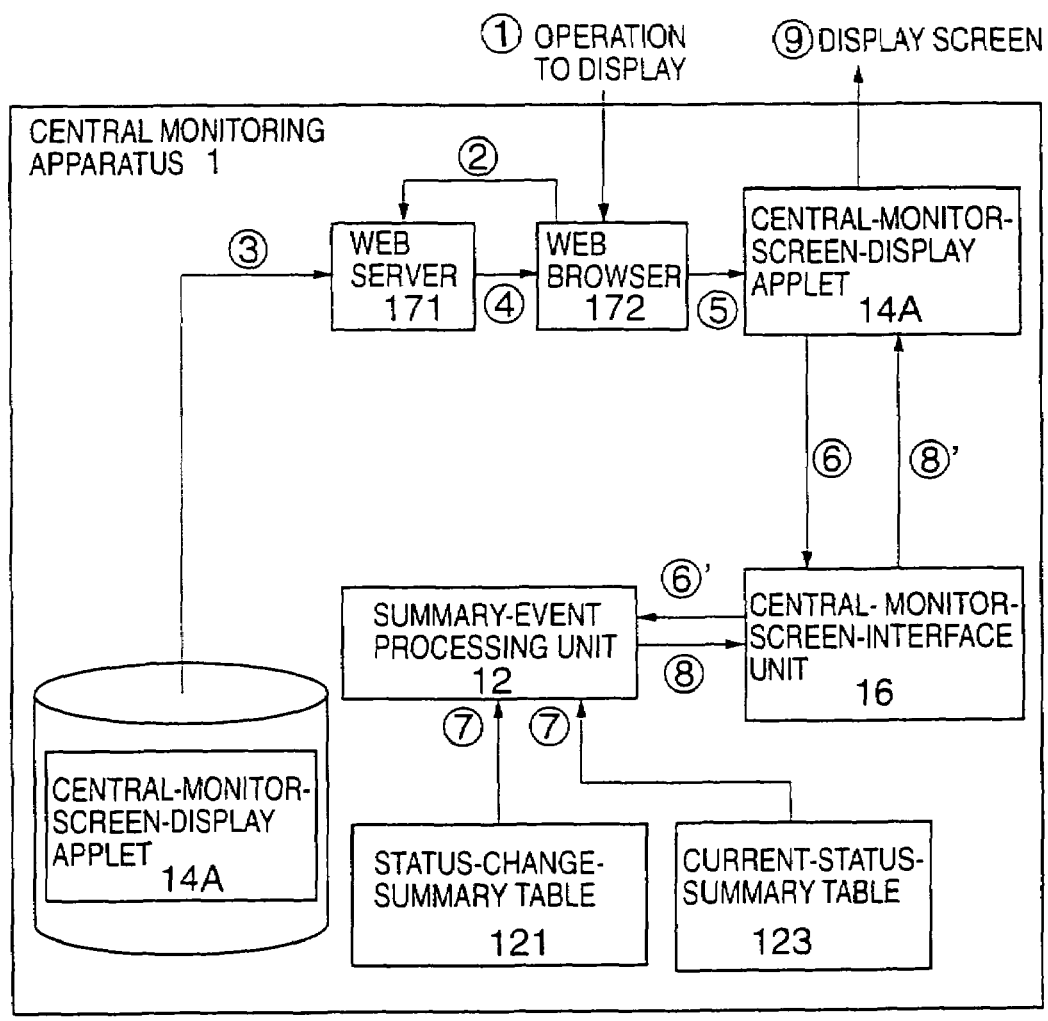
FIG. 17 is a process flow of a process performed by the central monitoring apparatus at a time when an operator operation to display a central monitor screen is carried out.

FIG. 17 is a process flow of a process performed by the central monitoring apparatus at a time when an operator operation to display a central monitor screen is carried out.

In the central monitoring apparatus 1, the Web browser 172 detects an operator operation for displaying a central monitor screen (step ST1), and requests the Web server 171 to display the central monitor screen (step ST2).

In response to the request, the Web server 171 reads the central-monitor-screen-display applet 14A and an HTML file defining the central monitor screen 11A (step ST3), and hands them to the Web browser 172 (step ST4). Having received the central-monitor-screen-display applet 14A, the Web browser 172 activates the central-monitor-screen-display applet 14A (step ST5).

The central-monitor-screen-display applet 14A activated by the Web browser 172 sends a request message to the central-monitor-screen-interface unit 16 (step ST6), requesting current statuses and status changes that are necessary for the displaying of the central monitor screen 11A.

In response to the request message, the central-monitor-screen-interface unit 16 forwards the request to the summary-event processing unit 12 (step ST6'). Upon receiving the request, the summary-event processing unit 12 reads the current-status-summary table 123 and the status-change-summary table 121 (step ST7). The summary-event processing unit 12 sends these tables to the central-monitor-screen-interface unit 16 as a response to the request (step ST8). Having received the response, the central-monitor-screen-interface unit 16 forwards the response to the central-monitor-screen-display applet 14A (step ST8').

Based on the response, the central-monitor-screen-display applet 14A selects a display color of an area icon 11A-1 having an alarm on the central monitor screen 11A such that the display color corresponds to the highest severity level among various severity levels observed in the corresponding local area, and, also, makes the area icon 11A-1 start flickering (step ST9).

Figure 18:
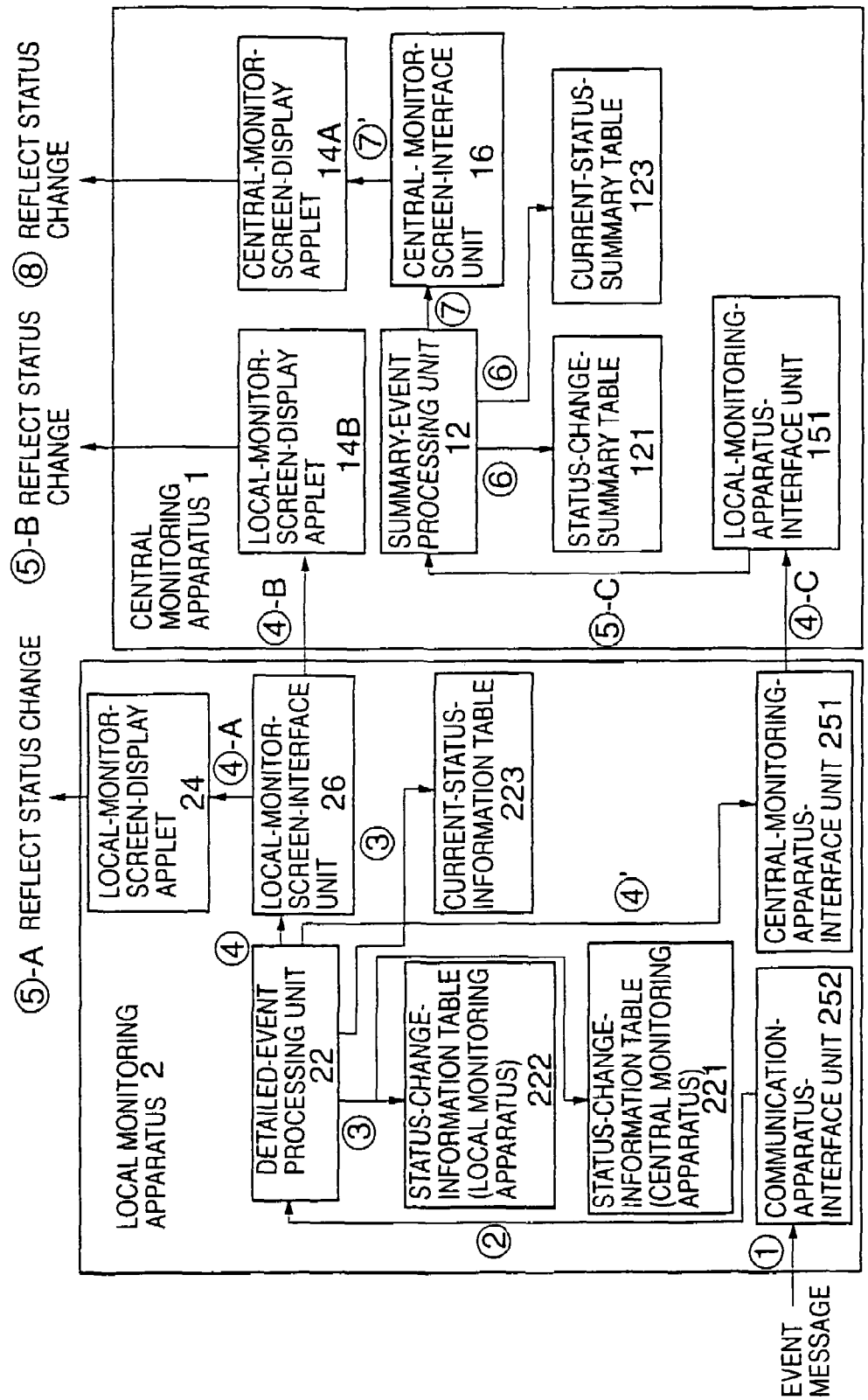
FIG. 18 is a process flow of a process of displaying status change at a time when a status change occurs.

FIG. 18 is a process flow of a process of displaying status change at a time when a status change occurs.

Upon detecting a status change of a monitored item, a communication apparatus sends an event message indicative of the status change to the local monitoring apparatus 2 (step ST1).

Having received the event message through the communication-apparatus-interface unit 252, the detailed-event processing unit 22 checks whether there is a status change. If there is a status change in a monitored item, the detailed-event processing unit 22 updates the status-change-information tables 221 and 222 as well as the current-status-information table 223 (step ST3). Further, the detailed-event processing unit 22 sends an event message to the local-monitor-screen-display 6-D applet 24 and 14B through the local-monitor-screen-interface unit 26 (steps ST4-A and ST4-B). Further, the detailed-event processing unit 22 sends an event message to the central monitoring apparatus 1 via the central-monitoring-apparatus-interface unit 251 (step ST4-C) if there is a change in summary information summarizing statuses of the monitored local area.

Upon receiving the event message from the local-monitor-screen-interface unit 26, each of the local-monitor-screen-display applets 24 and 14B changes a display color of a communication-apparatus icon of a communication apparatus that is experiencing the status change, so that the display color reflects the received status-change information (steps ST5-A and ST5-B). Further, the local-monitor-screen-display applets 24 and 14B make the respective icons flicker (steps ST5-A and ST5-B).

Having received the event message through the local-monitoring-apparatus-interface unit 151 (step ST5-C), the summary-event processing unit 12 updates the current-status-summary table 123 and the status-change-summary table 121 (step ST6), and sends an event message to the central-monitor-screen-display applet 14A through the central-monitor-screen-interface unit 16 (steps ST7 and ST7').

In response to the event message, the central-monitor-screen-display applet 14A changes a display color of the area icon 11A-1 of an area that is experiencing the status change, so that the display color reflects the reported status-change information. Further, the central-monitor-screen-display applet 14A makes the icon flicker (step ST8).

Figure 19:
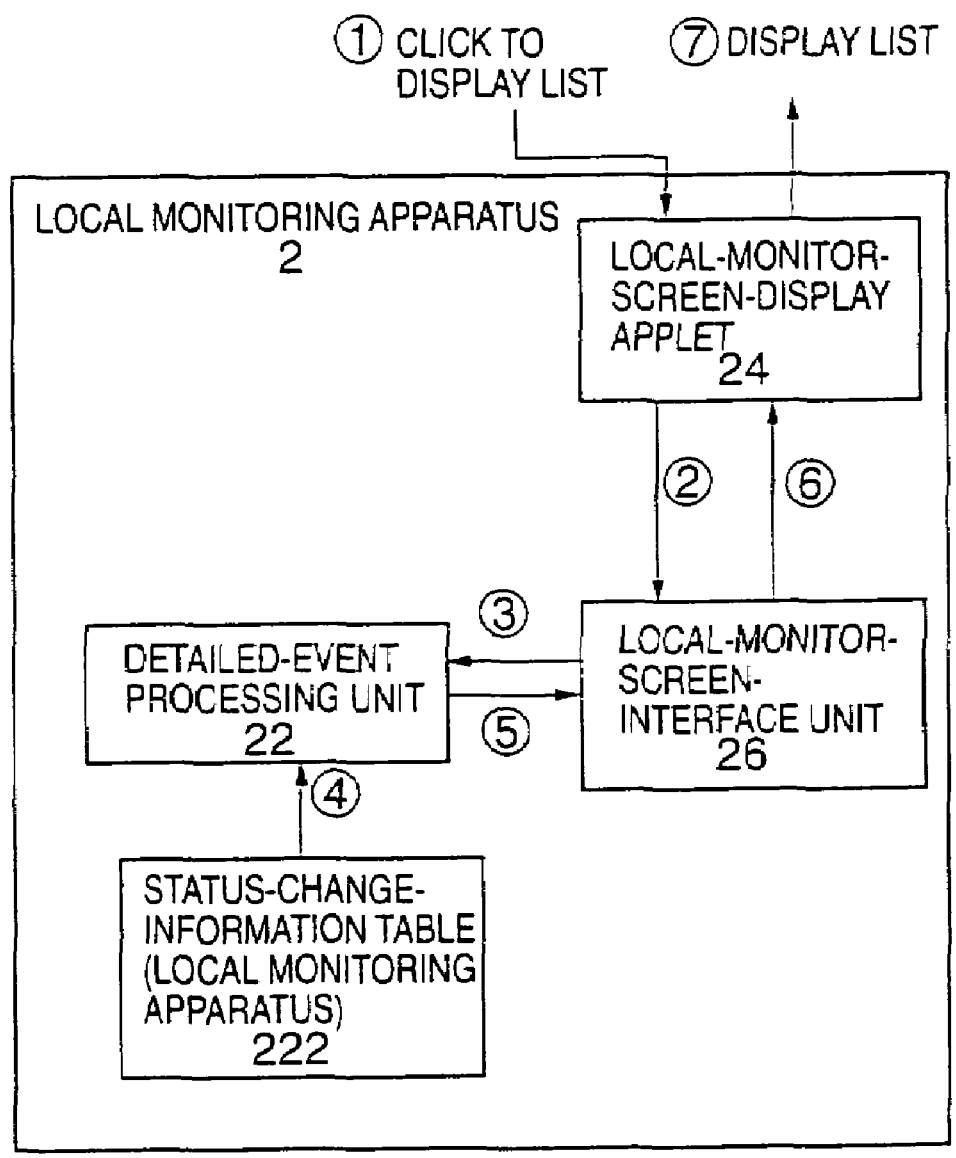
FIG. 19 is a process flow of a process performed by the local monitoring apparatus when an operator operation to display a status-change-information list is performed.

FIG. 19 is a process flow of a process performed by the local monitoring apparatus when an operator operation to display a status-change-information list is performed.

The local-monitor-screen-display applet 24 of the local monitoring apparatus 2 detects a click on the list-display button 21-2 (step ST1), and sends a request for transfer of status-change information to the detailed-event processing unit 22 via the local-monitor-screen-interface unit 26 (steps ST2 and ST3).

Having received the request for transfer of status-change information, the detailed-event processing unit 22 reads status-change information from the status-change-information table 222 for a local monitoring apparatus (step ST4), and sends the status-change information, as a response, to the local-monitor-screen-display applet 24 via the local-monitor-screen-interface unit 26 (steps ST5 and ST6). Upon receiving the response, the local-monitor-screen-display applet 24 displays the received status-change information on the list screen 21-3 (step ST7).

Figure 20:
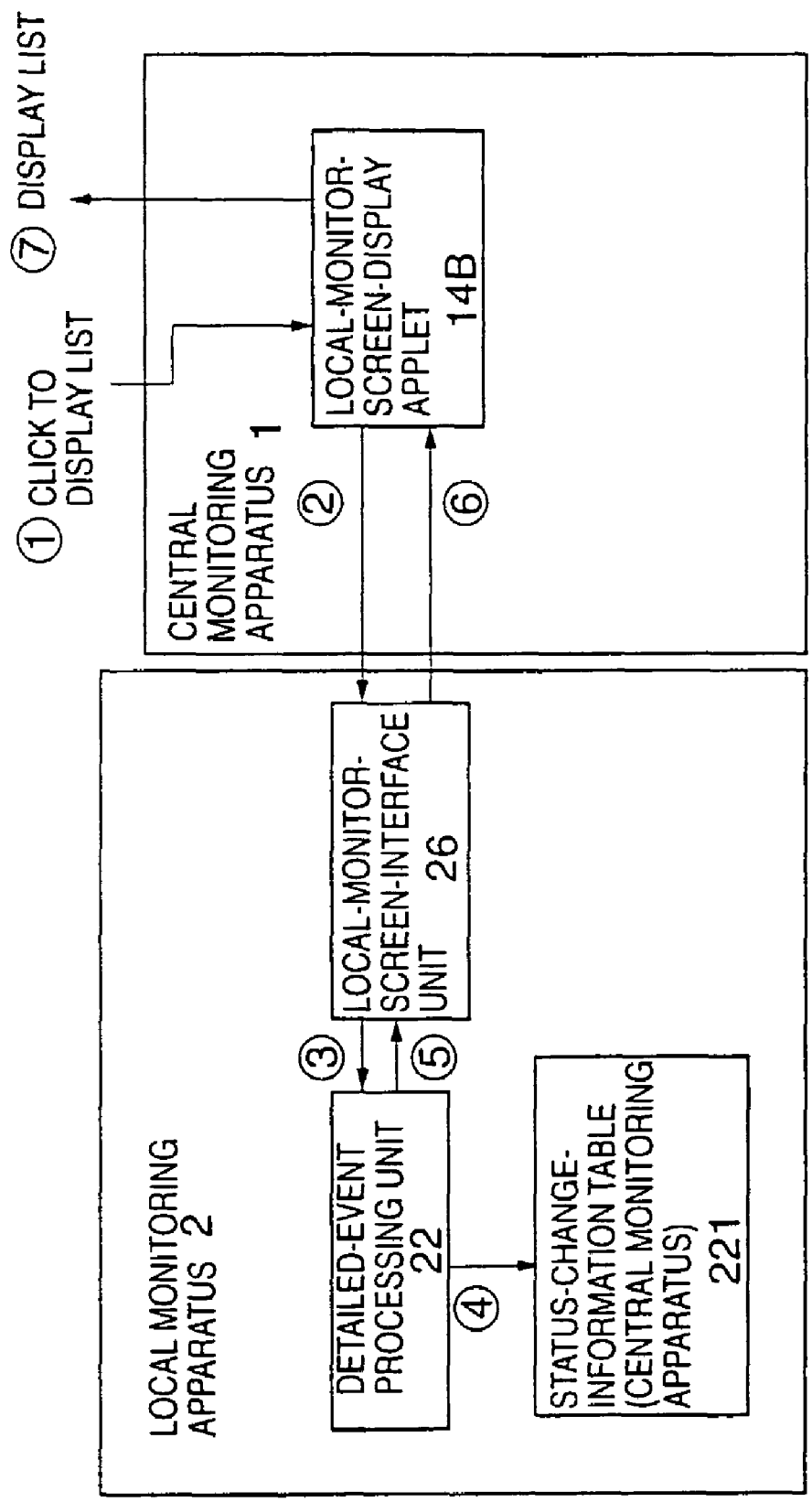
FIG. 20 is a process flow of a process performed when an operator operation to display a status-change-information list is performed with respect to a local monitor screen of the central monitoring apparatus.

FIG. 20 is a process flow of a process performed when an operator operation to display a status-change-information list is performed with respect to a local monitor screen of the central monitoring apparatus.

The local-monitor-screen-display applet 14B of the central monitoring apparatus 1 detects a click on the list-display button 11B-2 associated with the local monitor screen 11B of the central monitoring apparatus 1 (step ST1), and sends a request for transfer of status-change information to the detailed-event processing unit 22 of the local monitoring apparatus 2 via the local-monitor-screen-interface unit 26 of the local monitoring apparatus 2 (steps ST2 and ST3).

Having received the request for transfer of status-change information from the central monitoring apparatus 1, the detailed-event processing unit 22 reads status-change information from the status-change-information table 221 for a central monitoring apparatus (step ST4), and sends the status-change information, as a response, to the local-monitor-screen-display applet 14B of the central monitoring apparatus 1 via the local-monitor-screen-interface unit 26 (steps ST5 and ST6). Upon receiving the response, the local-monitor-screen-display applet 14B displays the received status-change information on the list screen 11B-3 (step ST7).

Figure 21:
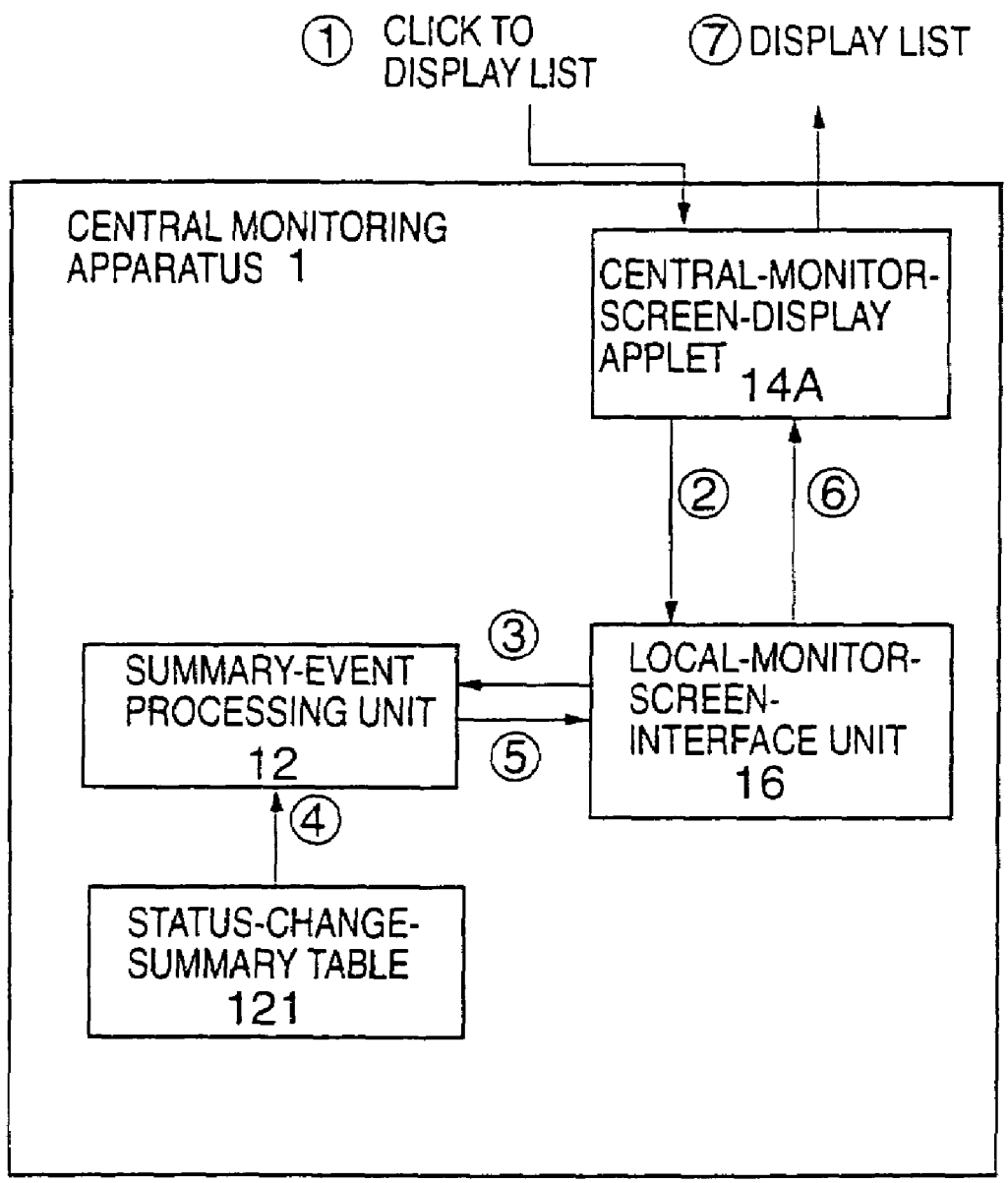
FIG. 21 is a process flow of a process performed by the central monitoring apparatus when an operator operation to display a status-change-information list is performed with respect to a central monitor screen.

FIG. 21 is a process flow of a process performed by the central monitoring apparatus when an operator operation to display a status-change-information list is performed with respect to the central monitor screen.

The central-monitor-screen-display applet 14A of the central monitoring apparatus 1 detects a click on the list-display button (step ST1), and sends a request for transfer of status-change information to the summary-event processing unit 12 via the central-monitor-screen-interface unit 16 (steps ST2 and ST3).

Having received the request for transfer of status-change information, the summary-event processing unit 12 reads status-change information from the status-change-summary table 121 (step ST4), and sends the status-change information, as a response, to the central-monitor-screen-display applet 14A via the central-monitor-screen-interface unit 16 (steps ST5 and ST6). Upon receiving the response, the central-monitor-screen-display applet 14A displays the received status-change information on the list screen 11A-3 (step ST7).

Figure 22:
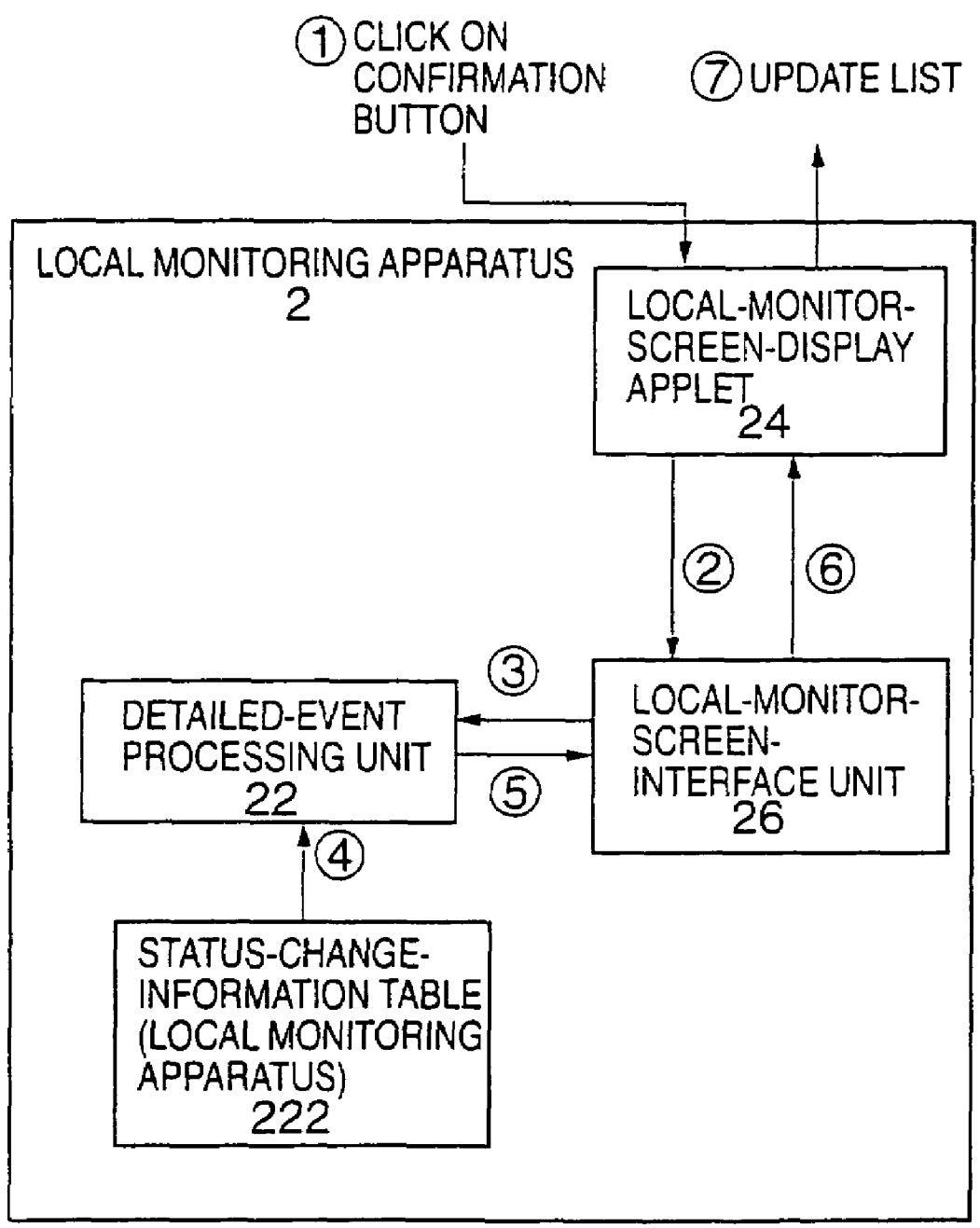
FIG. 22 is a process flow of a process performed by the local monitoring apparatus when a confirmation operation is performed on the local monitoring apparatus.

FIG. 22 is a process flow of a process performed by the local monitoring apparatus when a confirmation operation is performed on the local monitoring apparatus.

The local-monitor-screen-display applet 24 of the local monitoring apparatus 2 detects a click on the confirmation button 21-33 of the list screen 21-3 (step ST1), and sends a confirmation-process request to the detailed-event processing unit 22 via the local-monitor-screen-interface unit 26 (steps ST2 and ST3).

Having received the confirmation-process request, the detailed-event processing unit 22 erases relevant status-change information from the status-change-information table 222 for a local monitoring apparatus (step ST4), and sends a response acknowledging the confirmation to the local-monitor-screen-display applet 24 via the local-monitor-screen-interface unit 26 (steps ST5 and ST6).

Upon receiving the response, the local-monitor-screen-display applet 24 erases the confirmed status-change information from the displayed list, and stops flickering of the communication-apparatus icon 21-1 for which status changes are all confirmed.

Figure 23:
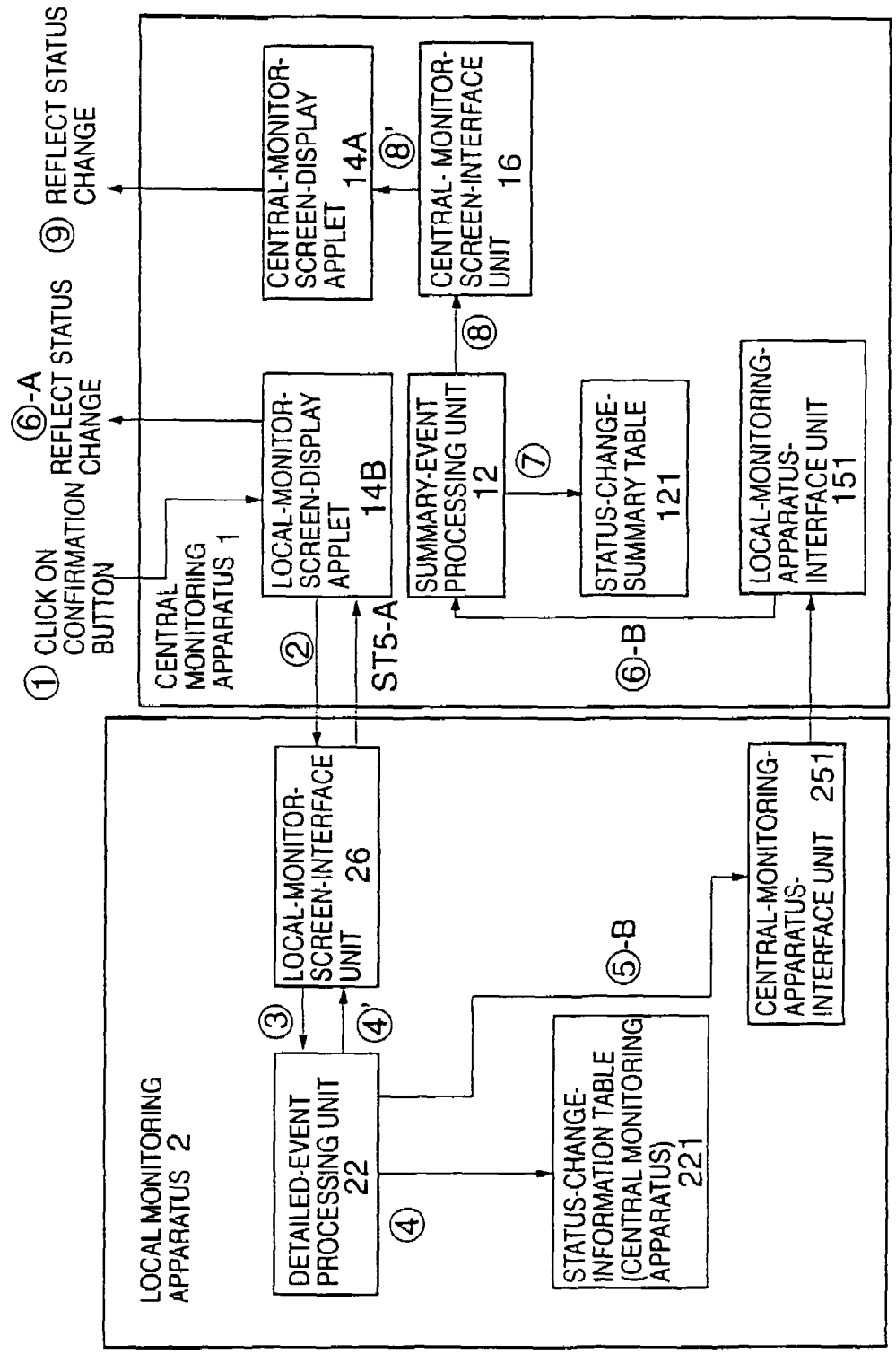
FIG. 23 is a process flow of a process performed when a confirmation operation is performed on a local monitor screen of the central monitoring apparatus.

FIG. 23 is a process flow of a process performed when a confirmation operation is performed on a local monitor screen of the central monitoring apparatus.

The local-monitor-screen-display applet 14B detects a click on the confirmation button 11B-33 of the list screen 11B-3 (step ST1), and sends a request to the detailed-event processing unit 22 of the local monitoring apparatus 2 via the local-monitor-screen-interface unit 26 of the local monitoring apparatus 2, requesting a confirmation process to be performed (steps ST2 and ST3).

Upon receiving the request for a confirmation process, the detailed-event processing unit 22 erases relevant status-change information from the status-change-information table 221 for the central monitoring apparatus in accordance with the contents of the request (step ST4). Further, the detailed-event processing unit 22 sends a response acknowledging the status-change confirmation to the local-monitor-screen-display applet 14B of the central monitoring apparatus 1 via the local-monitor-screen-interface unit 26 (steps ST4' and ST5-A), and sends a message indicative of status-change confirmation to the central monitoring apparatus 1 via the central-monitoring-apparatus-interface unit 251 (step ST5-B).

Having received the response acknowledging the status-change confirmation, the local-monitor-screen-display applet 14B erases the confirmed information from the list screen 11B-3 showing status-change information, and stops flickering of a communication-apparatus icon that represents a communication apparatus for which status changes are all confirmed (step ST6-A).

Having received the message indicative of status-change confirmation via the local-monitoring-apparatus-interface unit 151 (step ST6-B), the summary-event processing unit 12 erases the confirmed status-change information from the status-change-summary table 121 in accordance with the contents of the message (step ST7), and sends a message indicative of status-change confirmation to the central-monitor-screen-display applet 14A via the central-monitor-screen-interface unit 16 (steps ST8 and ST8').

In response to the message indicative of status-change confirmation, the central-monitor-screen-display applet 14A erases the confirmed status-change information from the list screen 11A-3 showing status-change information, and stops flickering of an area icon 11A-1 for which status changes are all confirmed (step ST9).

Figure 24:
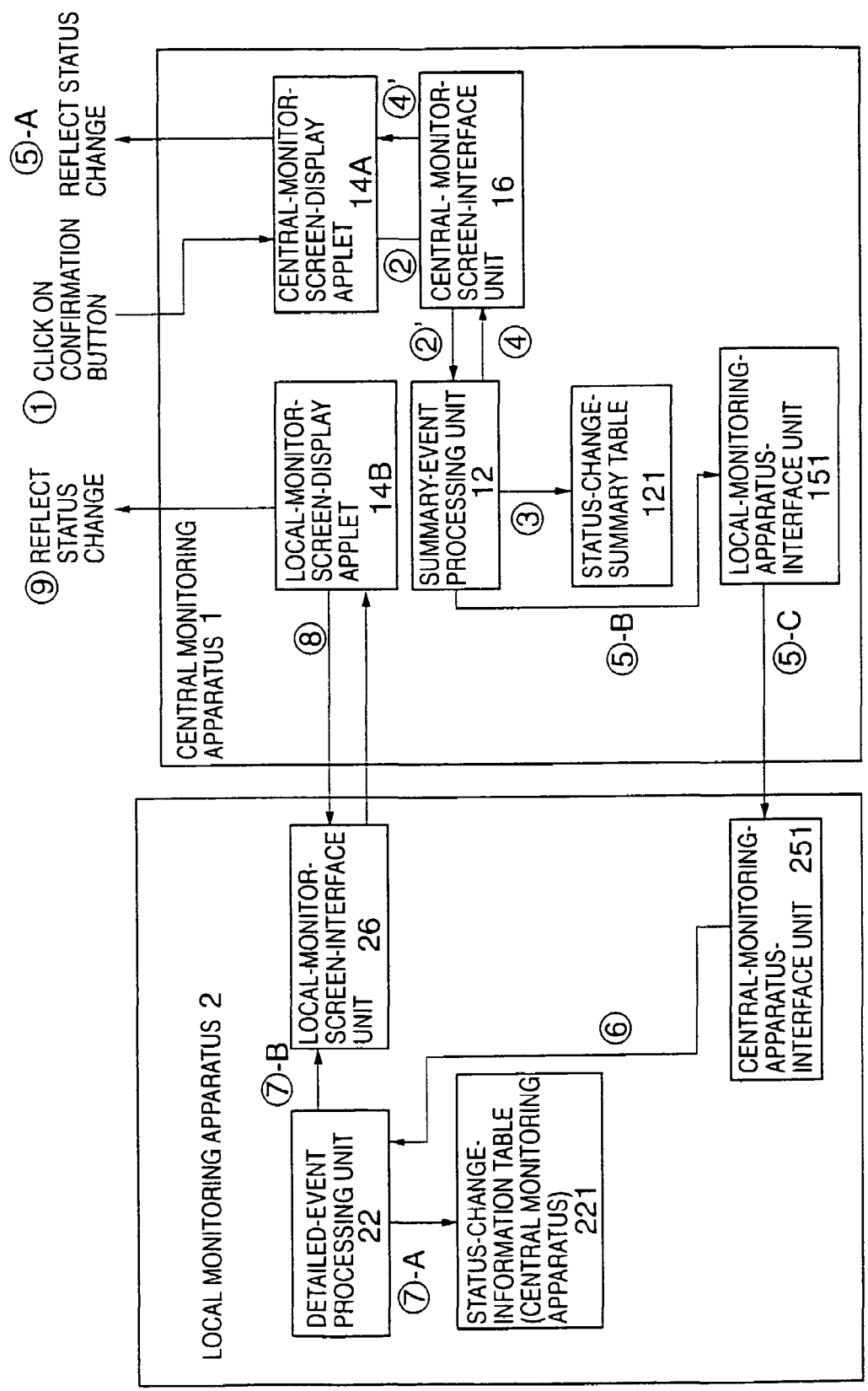
FIG. 24 is a process flow of a process performed when a confirmation operation is performed on the central monitor screen of the central monitoring apparatus.

FIG. 24 is a process flow of a process performed when a confirmation operation is performed on the central monitor screen of the central monitoring apparatus.

The central-monitor-screen-display applet 14A detects a click on the confirmation button 11A-33 of the list screen 11A-3 (step ST1), and sends a request to the summary-event processing unit 12 via the central-monitor-screen-interface unit 16 so as to request a confirmation process to be performed (steps ST2 and ST2').

Upon receiving the request for a confirmation process, the summary-event processing unit 12 erases relevant status-change information from the status-change-summary table 121 in accordance with the contents of the request (step ST3). Further, the summary-event processing unit 12 sends a response acknowledging the status-change confirmation to the central-monitor-screen-display applet 14A via the central-monitor-screen-interface unit 16 (steps ST4 and ST4'), and sends a message indicative of status-change confirmation to the local monitoring apparatus 2 via the local-monitoring-apparatus-interface unit 151 (steps ST5-B and ST5-C).

Having received the response acknowledging the status-change confirmation, the central-monitor-screen-display applet 14A erases the confirmed information from the list screen 11A-3 showing status-change information, and stops flickering of an area icon 11A-1 for which status changes are all confirmed (step ST5-A).

Having received the message indicative of status-change confirmation from the central monitoring apparatus 1 via the central-monitoring-apparatus-interface unit 251, the detailed-event processing unit 22 erases the confirmed status-change information from the status-change-information table 221 for the central monitoring apparatus in accordance with the contents of the message (step ST7-A), and sends a message indicative of status-change confirmation to the local-monitor-screen-display applet 14B of the central monitoring apparatus 1 via the local-monitor-screen-interface unit 26 (steps ST7-B and ST8).

In response to the message indicative of status-change confirmation, the local-monitor-screen-display applet 14B of the central monitoring apparatus 1 erases the confirmed status-change information from the list screen 11B-3 that shows status-change information in association with the local monitor screen 11B, and stops flickering of a communication-apparatus icon 11B-1 that represents a communication apparatus for which status-change information is all confirmed (step ST9).

Figure 25:
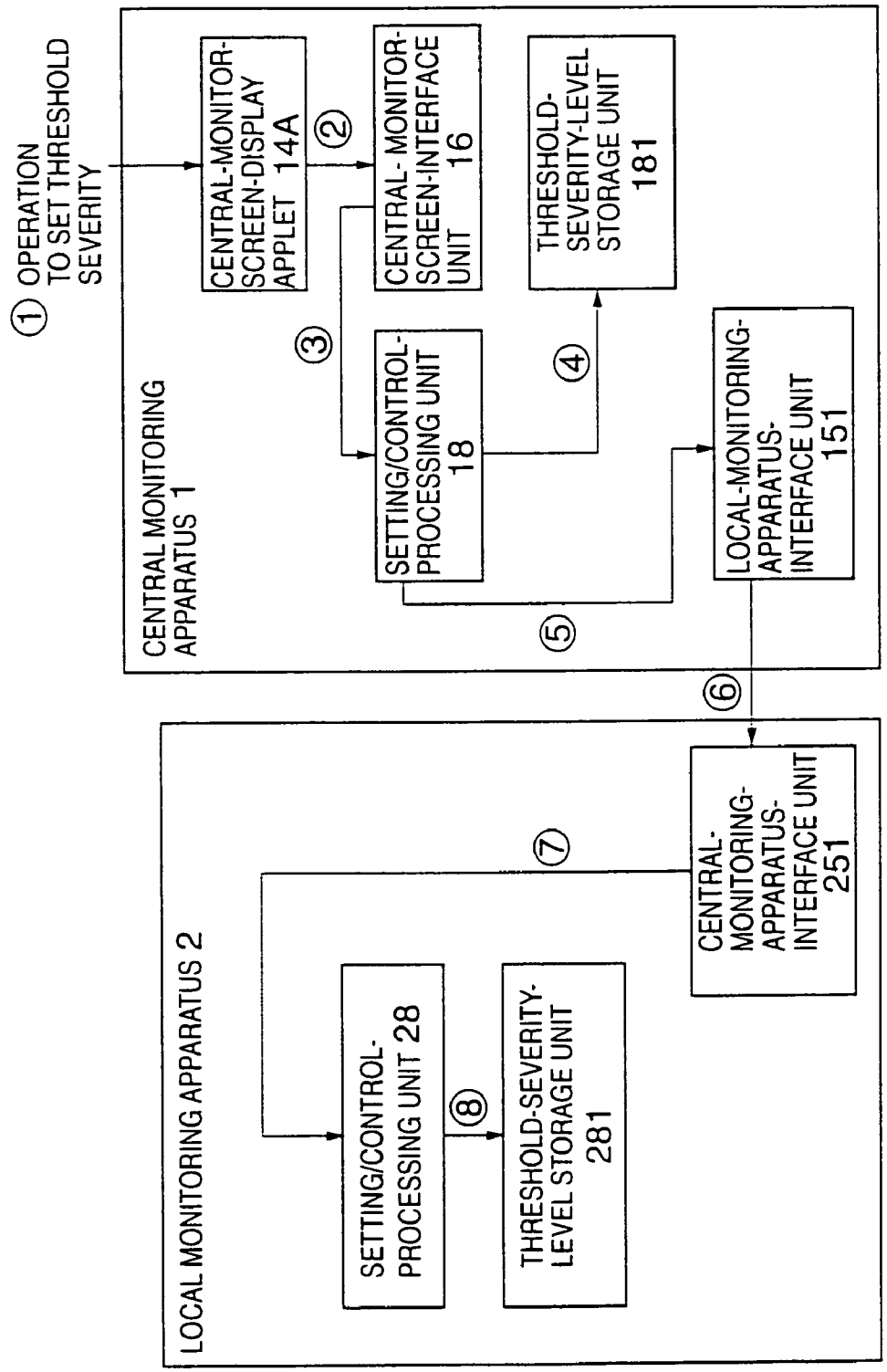
FIG. 25 is a process flow of a process performed when operation for making a setting to a threshold severity level is performed.

FIG. 25 is a process flow of a process performed when operation for making a setting to a threshold severity level is performed.

When an administrator of the central monitoring apparatus 1 performs an operation for setting a threshold severity level (step ST1), the central-monitor-screen-display applet 14A sends a severity-setting request to the setting/control-processing unit 18 via the central-monitor-screen-interface unit 16 (steps ST2 and ST3).

The setting/control-processing unit 18 of the central monitoring apparatus 1 updates a threshold severity level in accordance with the severity-setting request, and stores the threshold severity level in the threshold-severity-level storage unit 181 (step ST4). Further, the setting/control-processing unit 18 sends a message indicative of setting of a threshold severity level to the local monitoring apparatus 2 via the local-monitoring-apparatus-interface unit 151 (steps ST5 and ST6).

Having received the message from the central monitoring apparatus 1 via the central-monitoring-apparatus-interface unit 251 (step ST7), the setting/control-processing unit 28 of the local monitoring apparatus 2 updates a threshold severity level of the local monitoring apparatus 2 in accordance with the severity-setting request, and stores the threshold severity level in the threshold-severity-level storage unit 281 (step ST8).

Figure 26:
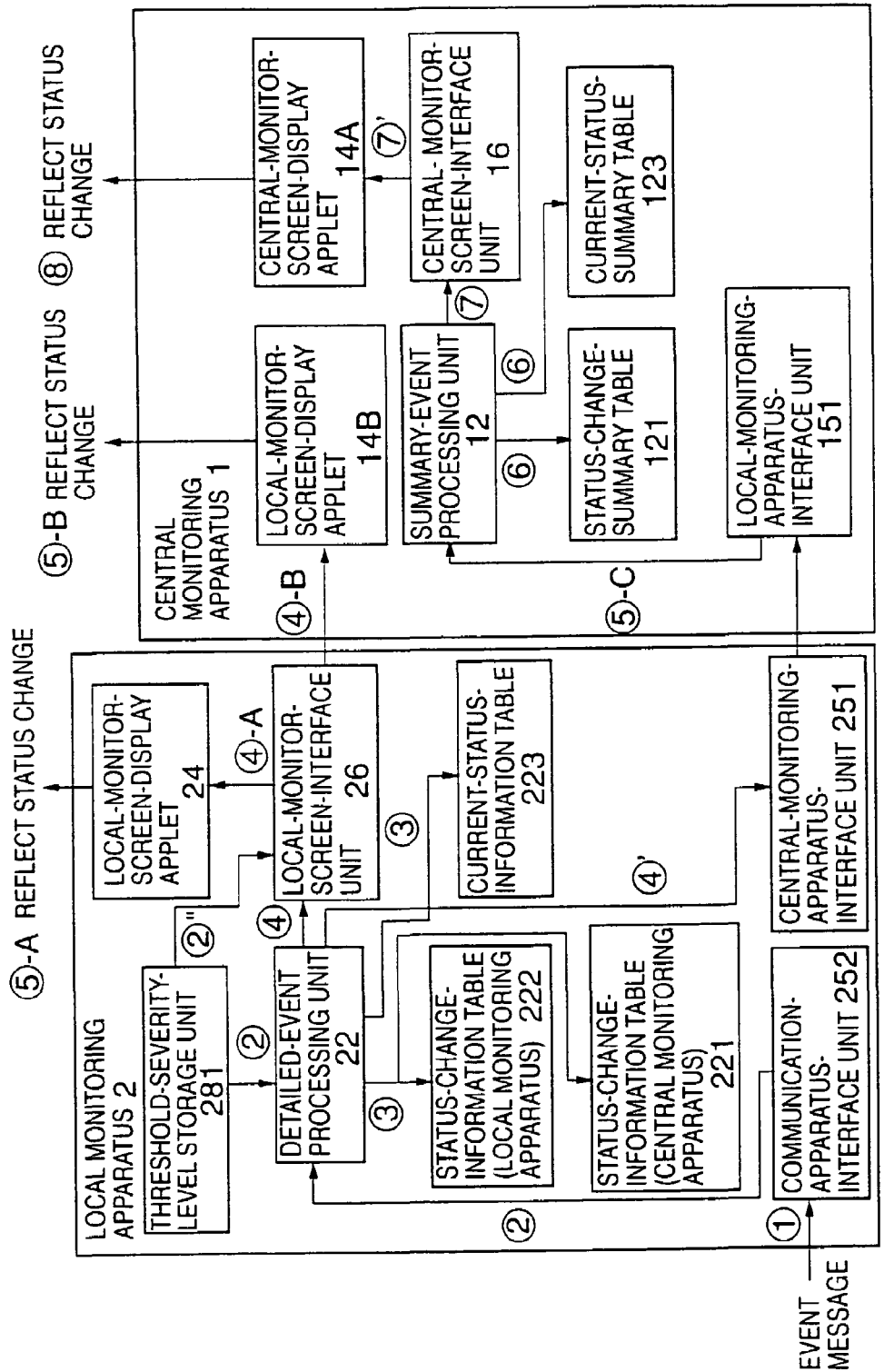
FIG. 26 is a process flow of a process performed in response to a status change when there is a setting to a threshold severity level.

FIG. 26 is a process flow of a process performed in response to a status change when there is a setting to a threshold severity level.

Upon receiving an event message, the detailed-event processing unit 22 of the local monitoring apparatus 2 consults the threshold severity level stored in the threshold-severity-level storage unit 281. If a severity level of the reported status change is lower than the threshold severity level, no event message is transmitted to the central monitoring apparatus 1.

When an administrator of the local monitoring apparatus sets a threshold severity level for controlling display of the local monitor screen, a threshold severity level is stored in a local-monitoring-apparatus threshold-severity-level storage unit (not shown). Accordingly, threshold-severity levels are stored separately for the central monitoring apparatus and for the local monitoring apparatus. Display of the local monitor screen on the local monitoring apparatus is controlled according to the threshold severity level of the local monitoring apparatus, and display of the central monitor screen of the central monitoring apparatus is controlled according to the threshold severity level of the central monitoring apparatus.

When receiving an event message from the detailed-event processing unit 22, the local-monitor-screen-interface unit 26 refers to the threshold severity level stored in the threshold-severity-level storage unit 281. If a severity level of the reported status change is lower than the threshold severity level, no event message is transmitted to the local-monitor-screen-display applet 14B of the central monitoring apparatus 1.

Figure 27:
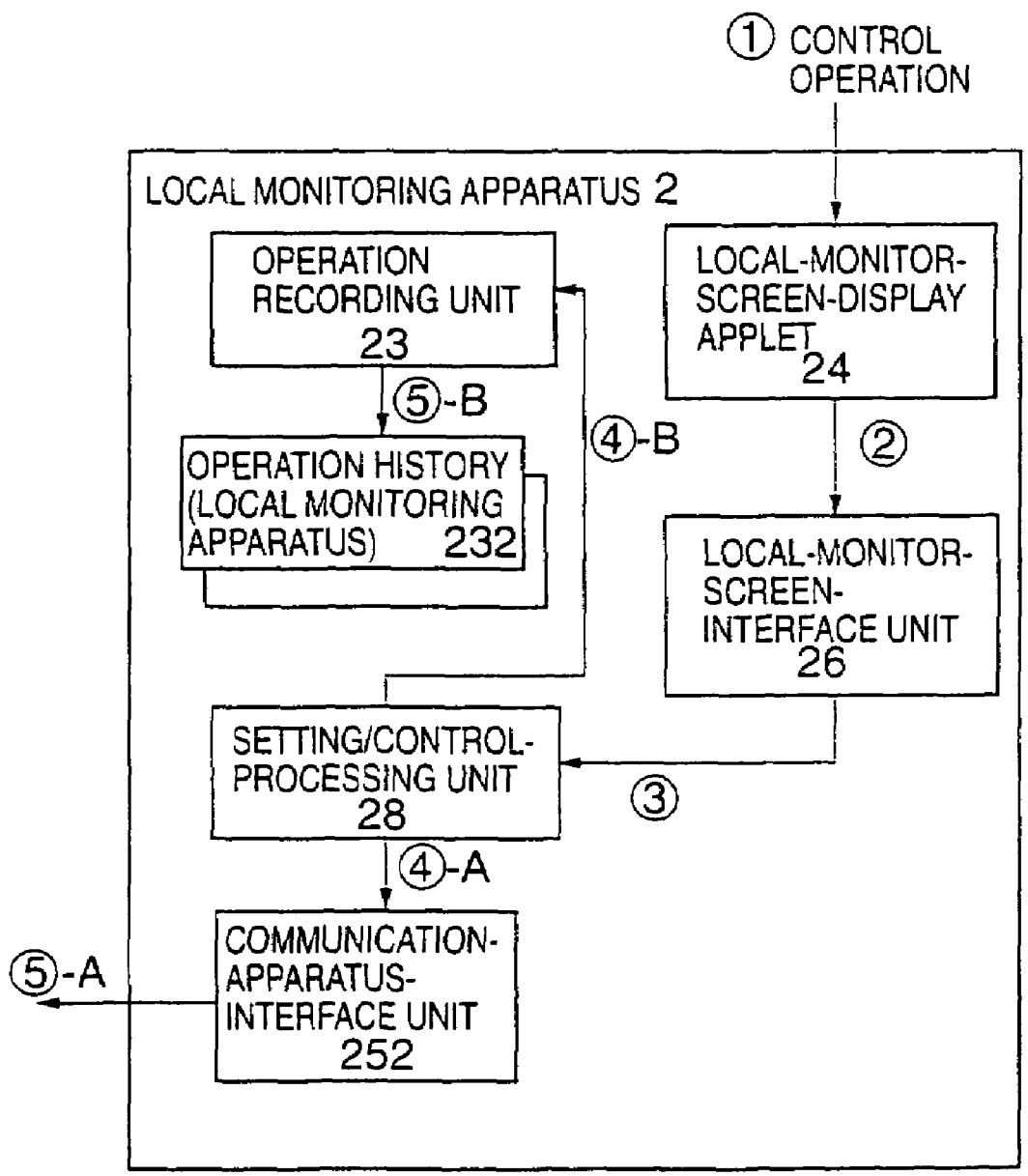
FIG. 27 is a process flow of a process performed when a control operation is performed on a local monitor screen of the local monitoring apparatus.

FIG. 27 is a process flow of a process performed when a control operation is performed on the local monitor screen of the local monitoring apparatus.

Upon detecting a control operation performed by an administrator of the local monitoring apparatus 2 (step ST1), the local-monitor-screen-display applet 24 sends a control-operation message to the setting/control-processing unit 28 via the local-monitor-screen-interface unit 26 (steps ST2 and ST3).

Upon receiving the control-operation message, the setting/control-processing unit 28 sends a control request to a relevant communication apparatus via the communication-apparatus-interface unit 252 (steps ST4-A and ST5-A), and sends a control-operation message to the operation recording unit 23 (step ST4-B). Since the control-operation message originates from the local monitoring apparatus 2, the operation recording unit 23 updates operation history stored in the operation history unit 232 dedicated for a local monitoring apparatus (step ST5-B)

FIG. 28 is a process flow of a process performed when a control operation is performed on cu the local monitor screen of the central monitoring apparatus.

Upon detecting a control operation performed by an administrator (step ST1), the local-monitor-screen-display applet 14B of the central monitoring apparatus 1 sends a control-operation message to the setting/control-processing unit 28 of the local monitoring apparatus 2 via the local-monitor-screen-interface unit 26 (steps ST2 and ST3).

Upon receiving the control-operation message, the setting/control-processing unit 28 forwards the control-operation message to a relevant communication apparatus via the communication-apparatus-interface unit 252 (steps ST4-A and ST5-A), and, also, forwards the control-operation message to the operation recording unit 23 (step ST4-B). Since the control-operation message originates from the central monitoring apparatus 1, the operation recording unit 23 updates operation history stored in the operation history unit 231 dedicated for the central monitoring apparatus (step ST5-B).

Further, the setting/control-processing unit 28 sends a control-operation message to the central monitoring apparatus 1 via the central-monitoring-apparatus-interface unit 251 (step ST5-B). In the central monitoring apparatus 1, the setting/control-processing unit 18 receives the control-operation message from the local-monitoring-apparatus-interface unit 151 (step ST6), and forwards the control-operation message to the operation recording unit 13 (step ST7). In accordance with the received control-operation message, the operation recording unit 13 updates operation history stored in the operation history unit 131.

In the embodiments described above, a monitor screen is not limited to what is shown on a En display device, but can be any types of visual outputs including, for example, a printout from a printer.

Further, the present invention is not limited to application to a multi-level management system comprised of a central monitoring apparatus and local monitoring apparatuses, but is also applicable to a single-level management system comprised of a plurality of monitoring devices communicating with each other to monitor communication apparatuses. In such a case, the present invention can be used as a means to manage and control monitored information between the plurality of monitoring devices.

Moreover, operation that should be reflected by information stored in the local monitoring apparatus is not limited to a confirmation operation or a control operation, but may include monitor operations such as modifying of information, marking of information, etc.

The present invention controls status-change information for the local monitor screens of the local monitoring apparatus separately from status-change information for the local monitor screens of the central monitoring apparatus. When a confirmation operation is performed on the local monitoring apparatus or on the central monitoring apparatus, an identification of the monitoring apparatus on which the operation is performed is attached to a message indicative of the confirmation operation. No matter whether the local monitoring apparatus is operated or the central monitoring apparatus is operated, the status-change information stored in the local monitoring apparatus is updated only with respect to the monitoring apparatus which was operated for confirmation. This makes sure that the local monitor screens of the other monitoring apparatuses are not affected by the confirmation operation, thereby insuring correct display of operation statuses.

Further, when a confirmation operation is carried out on the central monitoring apparatus, the status-change-summary information stored in the central monitoring apparatus is updated so as to keep the central monitor screen consistent with the current status, and a message is sent to the local monitoring apparatus to update the status-change information for the central monitoring apparatus stored in the local monitoring apparatus, thereby ensuring that the local monitor screens of the central monitoring apparatus are consistent with the central monitor screen of the central monitoring apparatus.

Further, use of ordinal numbers, which are given to status-change information independently within each classified group, makes it possible for an administrator to confirm the status-change information on a group-wise manner, thereby ensuring correct display of operation statuses. Further, when a restriction is placed to narrow a range of status-change information reported to the central monitoring apparatus, in this regard, the local monitoring apparatus controls the status-change information for the central monitoring apparatus separately from the status-change information for the local monitoring apparatus. Namely, separate restrictions for narrowing a range can be used between the local monitoring apparatus and the central monitoring apparatus. Further, this configuration keeps consistency of display information between the local monitor screens and the central monitor screen on the central monitoring apparatus.

Moreover, the local monitoring apparatus can record operation history for the central monitoring apparatus separately from operation history for the local monitoring apparatus. This makes it possible to manage and control operation histories independently between the central monitoring apparatus and the local monitoring apparatus.

In a multi-level management system where local monitoring apparatuses handle detailed actual control processes and a central monitoring apparatus is responsible for management and control of the summary information, the present invention allows the central monitoring apparatus to manage and control detailed information as well as the summary information while achieving separate control of the status-change information and operation history between the central monitoring apparatus and the local monitoring apparatus, thereby making it possible to carry through system development separately and independently for the central monitoring apparatus and for the local monitoring apparatus, reducing the time and labor for the system development.

Further, the present invention is not limited to these embodiments, but various variations and modifications may be made without departing from the scope of the present invention.

The present application is based on Japanese priority application No. 11-184797 filed on Jun. 30, 1999, with the Japanese Patent Office, the entire contents of which are hereby incorporated by reference.

What is claimed is:

1. A system for monitoring objects based on monitor information indicative of statuses of the objects, comprising:
    a local monitoring apparatus configured to store therein a first set of the monitor information and a second set of the monitor information, to change the first set of the monitor information in response to an operation performed on said local monitoring apparatus, and to display the first set of the monitor information on said local monitoring apparatus; and
    a central monitoring apparatus configured to communicate with said local monitoring apparatus to change the second set of the monitor information stored in said local monitoring apparatus in response to an operation performed on said central monitoring apparatus, and to display the second set of the monitor information on said central monitoring apparatus;
    wherein the first set of the monitor information and the second set of the monitor information are together updated to indicate a newly occurring event of the objects, and are changed independently for confirmation of the event by said local monitoring apparatus and said central monitoring apparatus, respectively.

2. The system as claimed in claim 1, wherein said central monitoring apparatus is further configured to store therein a summary of the monitor information, to change the summary of the monitor information in response to an operation performed on said central monitoring apparatus, and to display the summary of the monitor information on said central monitoring apparatus.

3. The system as claimed in claim 1, wherein the operation performed on said local monitoring apparatus includes an operation which a user of said local monitoring apparatus performs to confirm contents of the monitor information displayed on the local monitoring apparatus, and the operation performed on said central monitoring apparatus includes an operation which a user of said central monitoring apparatus performs to confirm contents of the monitor information displayed on the central monitoring apparatus.

4. The system as claimed in claim 2, wherein said central monitoring apparatus is configured to change the second set of the monitor information in response to an operation performed with respect to the monitor information displayed on the central monitoring apparatus as well as an operation performed with respect to the summary of monitor information displayed on the central monitoring apparatus, and to change the summary of the monitor information in response to the operation performed with respect to the monitor information displayed on the central monitoring apparatus as well as the operation performed with respect to the summary of the monitor information displayed on the central monitoring apparatus.

5. The system as claimed in claim 1, wherein said local monitoring apparatus is further configured to classify the monitor information into groups, and to give ordinal numbers to items of the monitor information, the numbers being counted within each of the classified groups.

6. The system as claimed in claim 1, wherein said central monitoring apparatus is further configured to allow a threshold severity level to be set and to send the threshold severity level to the local monitoring apparatus, and wherein said local monitoring apparatus is further configured to check whether an item of the monitor information has a severity level higher than the threshold severity level, and to store the item of the monitor information as part of the second set of the monitor information if the item of the monitor information has a severity level higher than the threshold severity level.

7. The system as claimed in claim 1, wherein said local monitoring apparatus is further configured to store therein a first operation history regarding operations performed on said local monitoring apparatus and to store therein a second operation history regarding operations performed on said central monitoring apparatus, and said central monitoring apparatus is further configured to store therein a third operations history regarding the operations performed on said central monitoring apparatus.

8. A monitoring apparatus for monitoring objects based on monitor information indicative of statuses of the objects, comprising:

a memory storage unit which stores therein a first set of the monitor information and a second set of the monitor information;

a processing unit which changes the first set of the monitor information in response to an operation performed on said monitoring apparatus, and changes the second set of the monitor information in response to an operation performed on another apparatus connected to said monitoring apparatus via a network;

an output unit which locally outputs the first set of the monitor information; and a transmission unit which transmits the second set of the monitor information to said another apparatus via the network;

wherein the first set of the monitor information and the second set of the monitor information are together updated to indicate a newly occurring event of the objects, and are changed independently for confirmation of the event by said monitoring apparatus and said another apparatus, respectively.

9. The monitoring apparatus as claimed in claim 8, wherein the operation performed on said monitoring apparatus includes an operation which a user performs to confirm contents of the monitor information that is locally output at said monitoring apparatus.

10. The monitoring apparatus as claimed in claim 9, wherein the processing unit erases the confirmed contents of the monitor information from the first set of the monitor information stored in said memory storage unit so as the make the first set of the monitor information reflect the operation performed on said monitoring apparatus.

11. A monitoring apparatus for monitoring objects based on monitor information indicative of statuses of the objects, connected to a plurality of monitoring apparatuses each monitoring respective groups of the objects, obtaining the monitor information and a summary of the monitor information from each of the monitoring apparatuses, outputting the summary of the monitor information collectively for all the objects, and outputting the monitor information separately for each of the groups of the objects, comprising:

a memory storage unit which stores therein the summary of the monitor information; and a processing unit which changes the summary of the monitor information, stored in the memory storage unit, in response to an operation performed on said monitoring apparatus, and sends a message to the plurality of monitoring apparatuses such that the plurality of monitoring apparatuses change the monitor information, stored in the plurality of monitoring apparatuses, in response to the operation performed on said monitoring apparatus;

whereby the monitor information updated in said plurality of monitoring apparatuses to indicate a newly occurring event of the objects is changed for confirmation of the event by said monitoring apparatus.

12. The monitoring apparatus as claimed in claim 11, wherein the operation performed on said monitoring apparatus includes an operation which a user of said monitoring apparatus performs to confirm contents of the summary of the monitor information that is output at said monitoring apparatus.

13. The monitoring apparatus as claimed in claim 11, wherein the processing unit erases the confirmed contents of the summary of the monitor information from the summary of the monitor information stored in said memory storage unit so as to change the summary of the monitor information in response to the operation performed on said monitoring apparatus.

* * * * *